United States Patent
Summers et al.

(10) Patent No.: US 6,556,696 B1
(45) Date of Patent: Apr. 29, 2003

(54) METHOD FOR SEGMENTING MEDICAL IMAGES AND DETECTING SURFACE ANOMALIES IN ANATOMICAL STRUCTURES

(75) Inventors: Ronald M. Summers, Potomac, MD (US); Scott Selbie, Rockville, MD (US); James D. Malley, Rockville, MD (US); Lynne M. Pusanik, Columbia, MD (US)

(73) Assignee: The United States of America as represented by the Department of Health and Human Services, Washington, DC (US)

( * ) Notice: Subject to any disclaimer, the term of this patent is extended or adjusted under 35 U.S.C. 154(b) by 0 days.

(21) Appl. No.: 10/072,667

(22) Filed: Feb. 5, 2002

Related U.S. Application Data

(60) Continuation of application No. 09/765,826, filed on Jan. 19, 2001, now Pat. No. 6,345,112, which is a division of application No. 09/136,136, filed on Aug. 18, 1998, now Pat. No. 6,246,784.
(60) Provisional application No. 60/056,452, filed on Aug. 19, 1997.

(51) Int. Cl.[7] ................................................. G06K 9/00
(52) U.S. Cl. ..................................................... 382/128
(58) Field of Search ................................ 382/128, 131, 382/154, 203, 204, 206, 218, 220, 225, 277, 285, 286; 345/420, 424, 425, 441, 442, 443; 434/403, 211, 256, 257; 700/29, 31, 98, 118

(56) References Cited

U.S. PATENT DOCUMENTS

| | | | |
|---|---|---|---|
| 4,569,014 A | * 2/1986 | Kishi et al. | 700/86 |
| 4,710,876 A | 12/1987 | Cline et al. | 345/423 |
| 4,719,585 A | 1/1988 | Cline et al. | 345/424 |
| 4,729,098 A | 3/1988 | Cline et al. | 345/421 |

(List continued on next page.)

FOREIGN PATENT DOCUMENTS

JP 07332970 12/1995 ............ G01C/3/06

OTHER PUBLICATIONS

"Stereo Matching with Transparency and Matting," *CVPR '97*, pp. 1–8, submitted Jun. 17–19, 1997.
Ashton et al., "A Novel Volumetric Feature Extraction Technique, with Applications to MR Images," *IEEE*, pp. 564–567, Sep. 1995.

(List continued on next page.)

*Primary Examiner*—Andrew W. Johns
*Assistant Examiner*—Shervin Nakhjavan
(74) *Attorney, Agent, or Firm*—Klarquist Sparkman, LLP

(57) ABSTRACT

A region growing method segments three-dimensional image data of an anatomical structure using a tortuous path length limit to constrain voxel growth. The path length limit constrains the number of successive generations of voxel growth from a seed point to prevent leakage of voxels outside the boundary of the anatomical structure. Once segmented, a process for detecting surface anomalies performs a curvature analysis on a computer model of the surface of the structure. This process detects surface anomalies automatically by traversing the vertices in the surface model, computing partial derivatives of the surface at the vertices, and computing curvature characteristics from the partial derivatives. To identify possible anomalies, the process compares the curvature characteristics with predetermined curvature characteristics of anomalies and classifies the vertices. The process further refines potential anomalies by segmenting neighboring vertices that are classified as being part of an anomaly using curvature characteristics. Finally, the process colorizes the anomalies and computes a camera position and direction for each one to assist the user in viewing 2D renderings of the computer model.

40 Claims, 9 Drawing Sheets

U.S. PATENT DOCUMENTS

| | | | | |
|---|---|---|---|---|
| 4,745,562 | A | 5/1988 | Prazdny | 702/71 |
| 4,751,643 | A | 6/1988 | Lorensen et al. | 387/132 |
| 4,791,567 | A | 12/1988 | Cline et al. | 345/424 |
| 4,821,210 | A | 4/1989 | Rumbaugh | 345/421 |
| 4,821,213 | A | 4/1989 | Cline et al. | 345/424 |
| 4,831,528 | A | 5/1989 | Crawford et al. | 382/131 |
| 4,868,748 | A | 9/1989 | Crawford et al. | 382/131 |
| 4,879,668 | A | 11/1989 | Cline et al. | 345/424 |
| 4,882,679 | A | 11/1989 | Tuy et al. | 600/425 |
| 4,896,278 | A | 1/1990 | Grove | 702/36 |
| 4,903,202 | A | 2/1990 | Crawford | 382/131 |
| 4,905,148 | A | 2/1990 | Crawford | 382/131 |
| 4,914,589 | A | 4/1990 | Crawford | 382/131 |
| 4,953,087 | A | 8/1990 | Crawford | 345/419 |
| 4,984,157 | A | 1/1991 | Cline et al. | 345/424 |
| 4,985,834 | A | 1/1991 | Cline et al. | 345/424 |
| 4,989,142 | A | 1/1991 | Crawford | 382/131 |
| 4,999,789 | A * | 3/1991 | Fiasconaro | 345/427 |
| 5,016,173 | A | 5/1991 | Kenet et al. | 382/128 |
| 5,038,302 | A | 8/1991 | Kaufman | 345/424 |
| 5,068,788 | A | 11/1991 | Goodenough et al. | 382/131 |
| 5,113,357 | A | 5/1992 | Johnson et al. | 345/424 |
| 5,133,020 | A | 7/1992 | Giger et al. | 382/128 |
| 5,150,427 | A | 9/1992 | Frazee et al. | 382/131 |
| 5,166,876 | A | 11/1992 | Cline et al. | 345/424 |
| 5,170,347 | A | 12/1992 | Tuy et al. | 345/419 |
| 5,179,441 | A | 1/1993 | Anderson et al. | 348/43 |
| 5,187,658 | A | 2/1993 | Cline et al. | 382/128 |
| 5,257,203 | A * | 10/1993 | Riley et al. | 700/163 |
| 5,268,967 | A | 12/1993 | Jang et al. | 382/132 |
| 5,273,040 | A * | 12/1993 | Apicella et al. | 600/410 |
| 5,277,182 | A | 1/1994 | Koizumi et al. | 600/413 |
| 5,289,374 | A | 2/1994 | Doi et al. | 600/407 |
| 5,291,402 | A | 3/1994 | Pfoh | 378/13 |
| 5,297,550 | A | 3/1994 | Margosian | 600/419 |
| 5,309,356 | A | 5/1994 | Nishide et al. | 382/131 |
| 5,319,551 | A | 6/1994 | Sekiguchi et al. | 382/131 |
| 5,345,490 | A | 9/1994 | Finnigan et al. | 378/4 |
| 5,381,518 | A | 1/1995 | Drebin et al. | 345/424 |
| 5,412,763 | A | 5/1995 | Knoplioch et al. | 345/424 |
| 5,425,368 | A | 6/1995 | Brandt | 600/408 |
| 5,452,367 | A | 9/1995 | Bick et al. | 382/128 |
| 5,465,323 | A * | 11/1995 | Mallet | 345/423 |
| 5,489,782 | A | 2/1996 | Wernikoff | 250/369 |
| 5,499,322 | A | 3/1996 | Thirion et al. | 345/418 |
| 5,506,785 | A | 4/1996 | Blank et al. | 700/98 |
| 5,517,602 | A | 5/1996 | Natarajan | 345/419 |
| 5,531,227 | A | 7/1996 | Schneider | 600/425 |
| 5,537,485 | A | 7/1996 | Nishikawa et al. | 382/130 |
| 5,550,376 | A | 8/1996 | Gupta et al. | 250/360.1 |
| 5,553,207 | A | 9/1996 | Sekiguchi et al. | 345/424 |
| 5,555,352 | A | 9/1996 | Lucas | 345/423 |
| 5,559,847 | A | 9/1996 | Hu et al. | 378/4 |
| 5,574,763 | A | 11/1996 | Dehner | 378/17 |
| 5,582,173 | A | 12/1996 | Li | 600/443 |
| 5,604,778 | A | 2/1997 | Polacin et al. | 378/9 |
| 5,611,000 | A * | 3/1997 | Szeliski et al. | 382/294 |
| 5,611,025 | A | 3/1997 | Lorensen et al. | 345/419 |
| 5,627,907 | A | 5/1997 | Gur et al. | 382/132 |
| 5,636,338 | A * | 6/1997 | Moreton | 345/442 |
| 5,719,954 | A | 2/1998 | Onda | 382/154 |
| 5,782,762 | A | 7/1998 | Vining | 600/407 |
| 5,920,319 | A * | 7/1999 | Vining et al. | 345/420 |
| 5,936,628 | A * | 8/1999 | Kitamura et al. | 345/420 |
| 6,078,680 | A * | 6/2000 | Yoshida et al. | 382/128 |
| 6,272,366 | B1 * | 8/2001 | Vining et al. | 600/407 |
| 6,343,936 | B1 | 2/2002 | Kaufman et al. | 434/262 |
| 6,345,112 | B1 * | 2/2002 | Summers et al. | 382/128 |

OTHER PUBLICATIONS

Besl et al., "Segmentation Through Variable–Order Surface Fitting," *IEEE Transactions on Pattern Analysis and Machine Intelligence*, vol. 10, No. 2, pp. 167–192, Mar. 1988.

Besl, *Surfaces in Range Image Understanding*, Springer–Verlag New York Inc., pp. 63–114 and 157–160, 1988.

Cai et al., "Displaying of Details in Subvoxel Accuracy," *Journal of Computer Science and Technology*, vol. 11, No. 5, pp. 480–488, Sep. 1996. (Abstract only).

Cline et al., "Three–Dimensional Segmentation of MR Images of the Head Using Probability and Connectivity," *Journal of Computer Assisted Tomography*, vol. 14, No. 6, pp. 1037–1045, Nov.–Dec. 1990.

Davatzikos et al., "Using a Deformable Surface Model to Obtain a Shape Representation of the Cortex," *IEEE Transactions on Medical Imaging*, vol. 15, No. 6, pp. 785–795, Dec. 1996.

Dill, "An Application of Color Graphics to the Display of Surface Curvature," *Computer Graphics*, vol. 15, No. 3, pp. 153–161, Aug. 1981.

Guo et al., "A New Method for Computer Recognition of Small Rounded Pneumoconiosis Opacities in Chest X–Rays," Eighth International Conference on Pattern Recognition, *IEEE Computer Society Press*, pp. 475–477, 1986.

He et al., "Fast Stereo Volume Rendering," *IEEE*, pp. 49–56 and 466, 1996.

Ichimura, "Volume Data Coding Based on Region Segmentation Using Finite Mixture Model," *Image Processing, 1996*, Sep. 16–19, 1996.

Kawata et al., "An Approach for Detecting Blood Vessel Diseases from Come–Beam CT Image," *In Proc. of ICIP–95*, vol. 2, pp. 500–503, Oct. 23–26, 1995.

Kawata et al., "Feature Extraction of Convex Surfaces on Blood Vessels Using Cone–Beam CT Images," International Conference on Image Processing, *IEEE*, vol. 3, pp. 315–318, Sep. 1996.

Kawata et al., "Measurement of Blood Vessel Characteristics for Disease Detection Based on Cone–Beam CT Images," *IEEE Transactions on Nuclear Science*, vol. 43, No. 6, pp. 3348–3354, Part 2, Dec. 1996. (Abstract only).

Lacrosse et al., "3D Spiral CT of the Tracheobronchial Tree," *Journal of Computer Assisted Tomography*, vol. 19, No. 3, pp. 347–347, May–Jun. 1995.

Lorensen et al., "The Exploration of Cross–Sectional Data with a Virtual Endoscope," *Interactive Technology and the New Health Paradigm*, IOS Press, pp. 221–230, Jan. 1995.

Lorensen, et al., Marching Cubes: A High Resolution 3D Surface Construction Algorithm, *Computer Graphics*, vol. 21, No. 4, pp. 163–169, 1987.

Mergo et al., "Three–dimensional CT of the Tracheobronchial Tree: Correlative Study with Bronchoscopy in 30 Cases," *Scientific Sessions*, p. 261. (Abstract only).

Monga et al., "Using Partial Derivatives of 3D Images to Extract Typical Surface Features," *Computer Vision and Image Understanding*, vol. 61, No. 2, pp. 171–189, Mar. 1995.

Rogers et al., *Mathematical Elements for Computer Graphics*, McGraw–Hill Publishing Co., New York, $2^{nd}$ Ed., pp. 420–421, 1990.

Röll et al., "Fast Generation of Leakproof Surfaces from Well–Defined Objects by a Modified Marching Cubes Algorithm," *Computer Graphics Forum*, vol 14, No. 2, pp. 127–138, 1995.

Sandor et al., "Segmentation of Brain CT Images Using the Concept of Region Growing," *Int. J. Biomed. Comput.*, vol. 29, pp. 133–147, 1991.

Scharstein et al., "Stereo Matching with Non–Linear Diffusion," *Proceedings of the 1996 IEEE Computer Society Conference on Computer Vision and Pattern Recognition*, pp. 343–350, Jun. 18–20, 1996.

Scharstein, "Stereo Vision for View Synthesis," *Computer Vision and Pattern Recognition, 1996*, pp. 852–858, Jun. 18–20, 1996.

Sekiguchi et al., "Interactive 3–Dimensional Segmentation Method Based on Region Growing Method," *Systems and Computers in Japan*, vol. 25, No. 1, pp. 88–97, 1994.

Sonka et al., "Rule–Based Detection of Inthrathoracic Airway Trees," *IEEE Transactions on Medical Imaging*, vol. 15, No. 3, pp. 314–326, Jun. 1996.

Stringham et al., "Probabilistic Segmentation Using Edge Detection and Region Growing," *Visualization in Biomedical Computing*, SPIE vol. 1808, No. 1808, pp. 40–51, 1992.

Summers et al., "CT Virtual Bronchoscopy of Simulated Endobronchial Lesions: Effect of Scanning, Reconstruction, and Display Settings and Potential Pitfalls," *AJR*, vol. 170, pp. 947–950, Apr. 1998.

Summers, "Image Gallery: A Tool for Rapid Endobronchial Lesion Detection and Display Using Virtual Bronchoscopy," *Journal of Digital Imaging*, vol. 11, No. 3, Supplement 1, pp. 53–55, Aug. 1998.

Summers et al., "Automatic Detection of Endobronchial Lesions with Virtual Bronchoscopy: Comparison of Two Methods," *Medical Imaging 1998: Image Processing*, vol. 3338, pp. 327–335, Feb. 23–26, 1998.

Summers, "Navigational Aids for Real–Time Virtual Bronchoscopy," *AJR*, vol. 168, pp. 1165–1170, May 1997.

Summers et al., "Polypoid Lesions of Airways: Early Exposure with Computer–assisted Detection by Using Virtual Bronchoscopy and Surface Curvature," *Radiology*, vol. 208, No. 2, pp. 331–337, Aug. 1998.

Summers et al., "Virtual Bronchoscopy. Segmentation Method for Real–Time Display," *Radiology*, vol. 200, No. 3, pp. 857–862, Sep., 1996.

Summers et al., "Computer–Assisted Detection of Endobronchial Lesions Using Virtual Bronchoscopy: Application of Concepts From Differential Geometry," May 27, 1997. (Abstract only).

Taubin, "A Signal Processing Approach to Fair Surface Design," Computer Graphics Proceedings, SIGGRAPH 95, pp. 351–358, Aug. 6–11, 1995.

Thirion et al., "Computing the Differential Characteristics of Isointensity Surfaces," *Computer Vision and Image Understanding*, vol. 61, No. 2, pp. 190–202, Mar. 1995.

Udupa, "Interactive Segmentation and Boundary Surface Formation for 3D Digital Images," *Computer Graphics and Image Processing*, vol. 18, pp. 213–235, 1982.

Van Gelder et al., "Direct Volume Rendering with Shading via Three–Dimensional Textures," *Proceedings 1996 Symposium on Volume Visualization*, pp. 23–30, 1996.

Vining et al., "Virtual Bronchoscopy; Relationships of Virtual Reality Endobronchial Simulations to Actual Bronchoscopic Findings," *Chest*, vol. 109, No. 2, pp. 549–553, Feb. 1996.

Wood et al., "Measurement of Three–Dimensional Lung Tree Structures by Using Computed Tomography," *American Physiological Society*, pp. 1687–1697, 1995.

Wood et al., "A Method for Measurement of Cross Sectional Area, Segment Length, and Branching Angle of Airway Tree Structures in Situ," *Computerized Medical Imaging and Graphics*, vol. 19, No. 1, pp. 145–152, 1995.

* cited by examiner

FIG. 3

| 16 | 15 | 14 |    |    |    |    |    | 14 | 15 | 16 |
|----|----|----|----|----|----|----|----|----|----|----|
|    | 14 | 13 | 12 |    |    |    | 12 | 13 | 14 |    |
|    |    | 12 | 11 |    |    |    | 11 | 12 |    |    |
|    |    | 11 | 10 |    |    |    | 10 | 11 | 13 |    |
|    |    | 10 | 9  | 8  |    | 8  | 9  | 10 | 12 |    |
|    |    | 10 | 8  | 7  |    | 7  | 8  | 10 | 13 |    |
|    |    |    | 7  | 6  | 5  | 6  | 7  | 16 | 14 |    |
|    |    |    | 6  | 5  | 4  | 5  | 6  |    | 15 |    |
|    |    |    |    | 4  | 3  | 4  |    |    | 16 |    |
|    |    |    |    | 3  | 2  | 3  |    |    |    |    |
|    |    |    |    | 2  | 1  | 2  |    |    |    |    |
|    |    |    |    | 2  | 0  | 2  |    |    |    |    |
|    |    |    |    | 2  | 1  | 2  |    |    |    |    |
|    |    |    |    | 3  | 2  | 3  |    |    |    |    |
|    |    |    |    | 4  | 3  | 4  |    |    |    |    |
|    |    |    |    | 5  | 4  | 5  |    |    |    |    |

METHOD FOR SEGMENTING MEDICAL IMAGES AND DETECTING SURFACE ANOMALIES IN ANATOMICAL STRUCTURES

RELATED APPLICATION DATA

This application is a continuation of U.S. patent application Ser. No. 09/765,826, filed on Jan. 19, 2001, now U.S. Pat. No. 6,345,112 which is a divisional of U.S. patent application Ser. No. 09/136,136, filed Aug. 18, 1998, now U.S. Pat. No. 6,246,784 which claims priority to U.S. provisional patent application No. 60/056,452, filed on Aug. 19, 1997, all of which are hereby incorporated by reference.

FIELD OF THE INVENTION

The present invention relates to feature extraction and identification in medical imagery. More particularly, the invention relates to methods for generating efficient models of complex anatomical structures in the presence of "leakage," and methods for employing such models as an aid to diagnosis.

BACKGROUND AND SUMMARY OF THE INVENTION

The science of medical image processing has taken tremendous strides in the past two decades, particularly in the field of three-dimensional visualization of internal anatomical structures. Such three dimensional models can be virtually rotated and viewed from any perspective, providing invaluable insights to surgeons, diagnosticians, researchers, and other scientists.

In its raw form, medical imagery typically consists of a large array of numbers representing the value of a physical property (e.g. radiological "density" or "intensity") at each of a plurality of regularly-spaced locations within the patient. The methods for generating structural models from this data proceed by generally well known principles.

One familiar class of techniques is known as "volume growing" (sometimes termed "region growing"). In accordance with these techniques, a seed voxel (volume element) is first identified within the anatomical structure of interest. Other voxels are successively analyzed and identified as belonging to the same structure if (1) they adjoin a voxel already identified as belonging to the structure, and (2) they meet a specified physical attribute (typically a radiological density in a range characteristic of the structure of interest).

According to standard region growing methods, after the seed voxel is identified, the six voxels sharing a face with the seed voxel are analyzed to determine if their physical attribute is within the specified range. If so, such voxels are marked as belonging to the structure. These voxels form a first tier of volume growth.

Next, each voxel in the first tier of volume growth is processed like a seed voxel, with adjoining voxels analyzed to determine whether their physical attributes are within the specified range. Voxels so identified form a second tier of volume growth.

This process continues, each iteration adding a shell of further voxels within the structure of interest.

In the simple case, this march of voxel cubes proceeds until growth in each direction is stopped by an exhaustion of voxels meeting the specified physical criterion. Collectively, the set of voxels thus identified fills the volume of the anatomical structure being analyzed, permitting its three-dimensional modeling.

The below-cited General Electric patents more fully detail the foregoing volume growing techniques and improvements thereto, including techniques for particularly locating the structure's bounding surface with reference to the vertices of the outermost voxels, techniques for smoothing/shading the bounding surface to facilitate viewing, etc.

A problem with foregoing technique, and most other volume growing algorithms, is that of "leakage." Leakage occurs when the march of cubes proceeds through the boundary of the structure being analyzed, rather than stopping as intended. Leakage causes the region growing to continue on the other side of the boundary, with a large number of voxels on the other side of the boundary spuriously identified as belonging to the structure of interest.

Leakage can occur for many reasons, including voxel dimensions larger than the boundary thickness, noise-induced imperfections in the bounding surface image data, etc.

As a general matter, leakage does not seriously impair the clinical usefulness of the extracted model. The leakage is an aesthetic distraction, but a reviewing physician can usually readily identify the leakage as a computer processing glitch. A more serious problem is the additional processing burden that leakage imposes on the three dimensional modeling software.

The computational complexity of three dimensional modeling is substantial. Such models typically include hundreds of thousands of data points, each of which must be processed every time the displayed model undergoes any change.

Much of the value of three dimensional modeling comes from the physician's ability to rotate the model, move his point of perspective, and zoom into and out from features of interest—all in real time. Each such operation requires that the display screen be "repainted" several times in quick succession to avoid the impression of jerky movement. Each such screen redraw, in turn, requires an enormous number of computations. The problem with leakage is that it vastly swells the dataset that must be processed, slowing the modeling software response time, and interfering With the physician's sense of real time interactivity.

The leakage problem in region/volume growing algorithms has been recognized for decades, and has been dealt with in various ways.

One way is simply to adopt a feature extraction technique relatively immune to leakage. One such class of techniques relies on deformable models. In "A Novel Volumetric Feature Extraction Technique, With Applications to MR Images," Int'l. Conf. on Image Proc., pp. 564–67, IEEE (1995), for example, Ashton et al model an expanding bubble whose expansion continues until the bubble fills the structure of interest. The shape of the bubble is controlled by a constraining force imposed by surrounding tissue and by a penalty for deviation from the expected surface normal. More particularly, Ashton et al. expand a seed voxel outwardly in an ovoid shape until the expected volume is reached, or until no further expansion is possible due to constraining tissue. (The ovoid shape is tailored in accordance with a priori information about the expected shape and size of the structure of interest.)

Leakage is rarely an issue in such deformable model techniques because, like a balloon, the expanding outer surface will not generally tunnel through a small opening and spawn a large ballooned volume on the other side.

Feature extraction techniques offering immunity to leakage are rare, and suffer from various drawbacks that have prevented their widespread adoption. Accordingly, various other solutions to the leakage problem have been proposed.

One solution has keyed on the characteristic shape of leakage volumes (i.e. a growth volume linked to a more central volume by a single (or a few) voxels). Computerized feature recognition techniques can be applied to identify such characteristic shapes and automatically delete them from the dataset. However, such approaches are generally disfavored in medicine due to the possible inadvertent deletion of clinically significant features.

In cases where the boundary of concern is thin, leakage can sometimes be ameliorated by employing commensurately small voxels (or subvoxels). With this approach, a boundary won't be missed by a voxel simply spanning the physical boundary. However, halving the edge size of the voxel effects an eight-fold increase in the number of voxels to be processed, with a corresponding slow-down in manipulation of the resulting three-dimensional model. Moreover, thin boundaries are sometimes simply not manifested in the image data being analyzed, due to inherent resolution limitations of the data acquisition device (e.g. CT or MRI scanner). In such cases, small voxels offer no solution.

U.S. application Ser. No. 07/797,893, cited in U.S. Pat. No. 5,553,207 to Sekiguchi et al, proposes an interactive solution to the leakage problem in which an operator monitors progress of the volume growth on a plurality of display devices and interrupts the process if a leak extends to a volume outside the structure of interest. (Several display devices are required due to growth in three dimensions.) Sekiguchi's '207 Patent extends this technique by facilitating deletion of the spurious growth by reverse expansion from an operator-identified voxel within the leaked volume.

A drawback of Sekiguchi's technique is its requirement of human interaction and real-time vigilance, increasing the cost of the diagnostic imagery and reducing the clinician's productivity. Another drawback is its failing in the context of complex branching structures. In such structures, a leak may not be manifested as a swelling blob—readily apparent to an operator, but as a tunneling path that snakes and grows in a chaotically-bound volume outside the structure of interest. Such spurious growth may not be obvious to a monitoring operator, but nonetheless swells the dataset that is later manipulated for three dimensional display to a reviewing physician.

Another approach to the leakage problem is to define a boundary (e.g. a parallelepiped) beyond which volume growth is not permitted. Each time growth to a new voxel is considered, its x, y and z coordinates are checked to insure that each is within the prescribed limits.

While the foregoing boundary constraint avoids unbounded leakage, significant leakage can still occur, resulting in awkward delays in manipulation of the three-dimensional model.

U.S. Pat. No. 4,905,148 to Crawford considers and dismisses several approaches to the leakage problem, including (a) manually identifying potential bridges before the connectivity algorithm is applied; (b) circumscribing the stricture of interest with a user-defined boundary; and (c) requiring a higher order of connectivity (e.g. several approaches generally suitable, Crawford instead proposes a technique employing several seeds: one inside the structure of interest, and one or more outside. Region growing is first applied to the outside seed(s) using a directional criteria chosen to avoid the structure of interest (e.g. by specifying growth only in directions away from the structure of interest). The values of voxels identified by this first operation are then modified. Region growing can then proceed from the first seed voxel without possibility of leakage to those voxels whose values were modified.

Crawford's method is illustrated in the context of preventing region growth in a skull from leaking outside through, e.g., eye socket cavities. In this context the area of potential leakage is large and obvious: the volume outside the skull. In many other contexts, however, this is not the case. Many anatomical structures have complex branching topologies, preventing a clinician from readily identifying regions of likely leakage. Moreover, Crawford's technique requires operator-assisted pre-processing of the data, a step which is costly and often impractical.

In accordance with one aspect of the present invention, the foregoing and other drawbacks of the prior art are overcome. Leakage outside a structure of interest is constrained by an operator-set distance parameter. Unlike the simple bounding volume constraint of the prior art, this distance parameter refers to the tortuous path length actually traversed by a branch of a growing volume, rather than a straight-line distance between the beginning and end points. (A conventional bounding volume can be imposed as a secondary, fail-safe constraint, in case the anatomy outside the structure does not impose a chaotic path on the leakage volume.) The relative growth rates in three dimensions can be specified independently to provide for more efficient extraction of features whose shapes are generally known.

By the foregoing arrangement, leakage in complex anatomical structures is controlled without human intervention, yielding models better suited for rapid three dimensional manipulation.

One type of rapid three dimensional manipulation that would be unthinkable if a model were burdened with the large leakage volumes, but which is practical if such volumes are controlled, is virtual navigation of the model. In such methods, a physician "steers" himself through the structure using a joystick or the like, with an associated display being updated—seemingly in real-time—in accordance with the joystick's movements. This arrangement allows a physician to conduct a virtual tour of an anatomical structure, visiting features of interest while ignoring others.

While a random virtual exploration of the anatomical structure can be informative, better use of the physician's time may be made by use of a guide. In accordance with a further aspect of the invention, a compilation of sites of potential interest is generated by a computer analysis of the imagery data, and serves to guide the physician in his virtual review of the anatomy. In one embodiment, this guide data is employed to direct the virtual tour, automatically navigating through the structure until a feature of interest is centered in view, and then pausing. The physician can then inspect the feature, using the joystick to move around as desired. After the physician has taken whatever note of the feature is merited, the tour is resumed, with the system navigating the physician to the next feature, and so on.

In another embodiment, the guide does not automatically navigate from virtual location to location for the physician. Instead, the guide data is used to highlight features of interest, e.g. by changing their color, so that the physician can take note of them on a self-guided tour.

In both these embodiments, a second 2D map-like display can be employed to identify the position of the physician's virtual perspective within the model, so as to avoid disorientation.

In an illustrative embodiment, the discernment of features for inclusion in the guide is performed by reference to their shape. In an embodiment tailored for diagnosis of bronchial pathologies, for example, functions of partial derivatives of a parameterized surface, and functions of a surface displacement vector, are employed. In another embodiment, a 3D filter computes partial derivatives of a surface model. The 3D filter visits each vertex in the model and filters neighboring voxels to compute the partial derivatives of the surface at the vertex. In both embodiments, the partial derivatives are used to compute curvature characteristics. By comparing the curvature characteristics with predetermined characteristics, surface anomalies can be detected and highlighted for review. These methods have been found to accurately characterize the shape of polypoid lesions found in the bronchus and can be adapted for other anatomical structures as well.

By the foregoing arrangement, a physician's attention is advantageously focused on features of potential clinical significance, enhancing the physician's effectiveness and improving patient care.

The foregoing and additional features and advantages of the invention will be more readily apparent from the following detailed description, which proceeds with reference to the accompanying drawings.

BRIEF DESCRIPTION OF THE DRAWINGS

FIG. 3 is a voxel map showing an example of ratioed growth.

DETAILED DESCRIPTION

Figure 1:
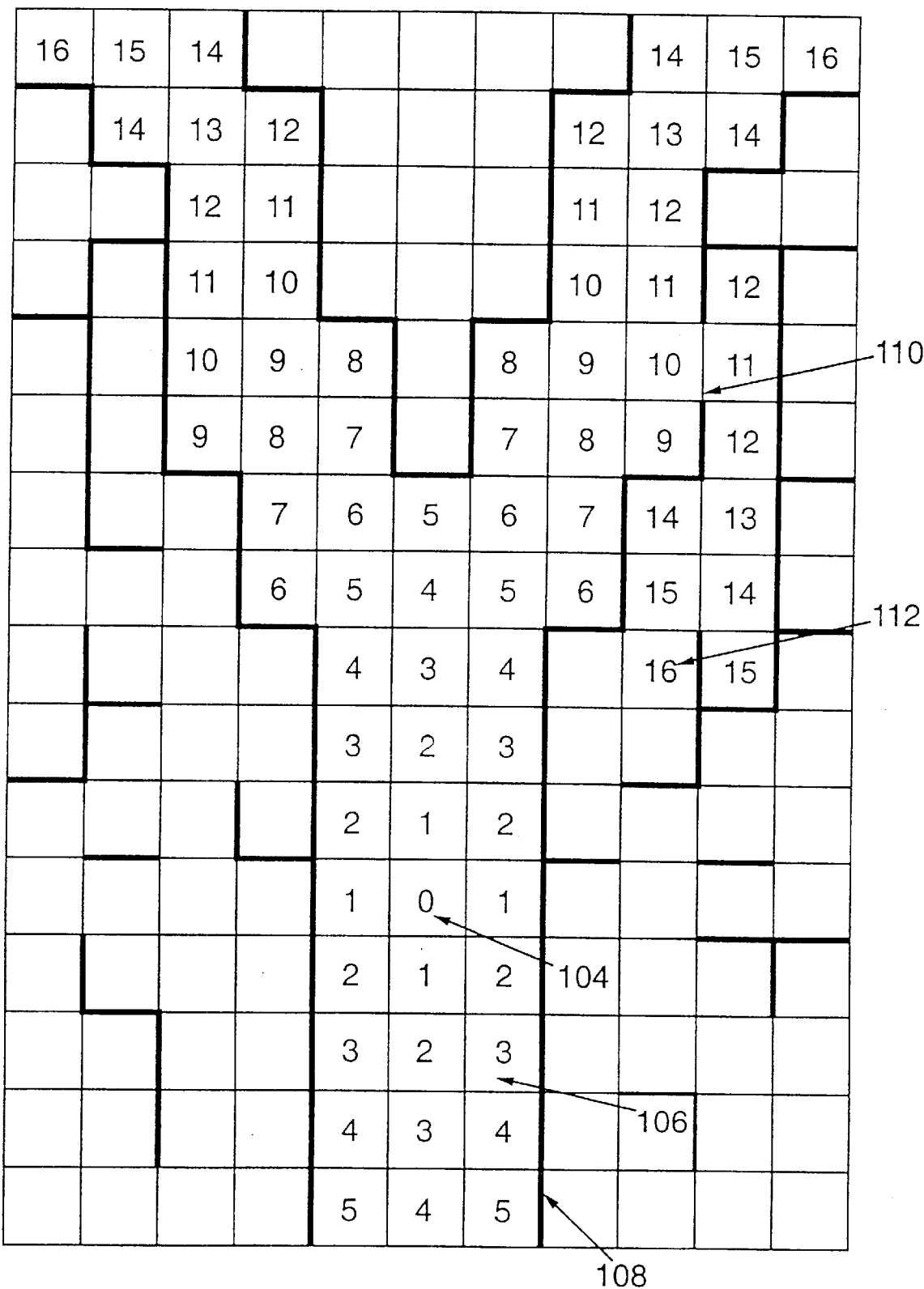
FIG. 1 is a simplified 2D voxel map of a branching structure, such as the bronchus, showing constraint of voxel leakage according to one embodiment of the present invention.

For expository convenience, the following disclosure focuses on use of the present technology in the context of bronchoscopy. As will be apparent to those skilled in the art, the technology is not so limited, but can be applied to extraction and analysis of models of any other anatomical structure.

Similarly, the invention is particularly illustrated with reference to data generated by X-ray computed tomography processes, but can likewise be applied to any other medical image data, including data generated by magnetic resonance imaging, positron emission tomography, ultrasound imaging, etc.

Computed tomographic (CT) bronchoscopy, or virtual bronchoscopy (VB) as it is also known, is a recently developed technique in which thin-section CT data (commonly helical scan CT data) are reformulated to provide a realistic surface rendering of the inner walls of hollow structures, which can then be inspected with use of an endoscope-like paradigm. Several preliminary studies have investigated this technique for virtual endoscopy of the colon. Exploration of the airways, however, is just as feasible. One source of difficulty has been the multiple branching of the airways. One approach to this problem is to use region-growing techniques: With use of a seed point, all connected voxels within the airway lumen with thresholds that are within a specified range can be selected.

In practice, use of region-growing methods is limited because the segmented region tends to also include undesired portions of the volume. In addition to the leakage mechanisms discussed above, leakage occurs in bronchoscopy data because the threshold for region growing cannot be set to both include the smaller airways but exclude the pulmonary parenchyma. This is a particular problem in the smaller bronchi, owing to partial-volume effects.

As noted, segmentation leakage is a problem because it increases the complexity of the three-dimensional (3D) model of the bronchi. Inclusion of the adjacent unwanted lung in the desired volume results in the generation of surfaces along the pleura and pulmonary vessels in addition to surfaces specific to the airway wall. If the processing power and display speed of computer graphics were unlimited, this would not pose a problem because the huge number of elements that Wake up the shaded surface display could be rotated, zoomed, panned, and manipulated at will interactively. Shaded surface displays composed of a million triangles or more, however, cannot be rendered with a sufficient frame rate to allow interactive manipulation of the object at practical graphics workstations. Thus, segmentation leakage results in airway models that are too complex to be rendered in real time.

In addition to creating complex surface models, leakage also inhibits further automated and semi-automated analyses on the segmented structure. For example, it complicates and potentially prevents the detection of surface anomalies and other geometric shapes using automated techniques. Moreover, leakage may also cause such detection methods to identify leakage as an area of interest.

In accordance with a preferred embodiment for imaging the bronchial walls, a region-growing technique is applied in which the tortuous path length distance from a seed point is controlled to avoid selection of unwanted voxels in the pulmonary parenchyma. Additional seed points can be placed to fine-tune the segmentation. The surface-rendered models created with this method typically have fewer than 100,000 triangles and can be readily manipulated in real time. The resulting model provides a faithful representation of the CT data and can be used for accurate measurement of bronchial diameters. A review of an experimental setup verifying the efficacy of these methods follows.

Protocol for CT.—Fourteen patients (four men and ten women, aged 19–67 years [mean, 36 years]) with a clinically relevant indication to undergo thin-section CT of the airways underwent helical CT (High Speed Advantage scanner: GE Medical Systems, Milwaukee, Wis.). Scans were acquired with use of 3-mm collimation, 140 kVp, 160 mA, and a helical pitch of 2:1, according to the method of Vining et al, "Virtual Bronchoscopy," Radiology, 193(P):261; see also Chest, Vo. 109, No. 2, pp. 549–553 (February, 1996). Scanning extended from the level of the thoracic inlet through the dome of the diaphragm. To reduce the effect of section misregistration between breath holds, a 15-second breath hold was used and a 15-second rest period was provided to allow patients to catch their breath. It was found that even very ill patients could easily tolerate this regimen. Typically, the entire bronchial tree could be scanned in two to three breath holds. To reduce the problem of section misregistration in the complex anatomic structures of the lobar bifurcations, breath-hold clusters were arranged to encompass this area in a single breath hold. The digital scout view was used as a guide for planning the location of the scanning clusters. The display field of view was reduced to 26 cm or less, depending on the size of the patient, to provide the highest possible in-plane resolution for the smaller bronchi without clipping them from the field of view. Images were retrospectively reconstructed by using a 1-mm section index and a high-frequency bone algorithm.

Generation and Display of 3D Surface-rendered Model

The number of reconstructed images ranged from 137 to 326, with a 512×512 matrix. The 16-bit gray-scale data were first converted to 8 bits by using a window level of −600 HU and a window width of 600 HU.

Segmentation was achieved by means of a six-face region-growing method. A first seed point was placed at the coordinates $(x_s, y_s, z_s)$. The voxels at coordinates $(x_s \pm 1, y_s, z_s)$, $(x_s, y_s \pm 1, z_s)$, and $(x_s, y_s, z_s \pm 1)$ were investigated to determine whether they were within the acceptable threshold range. If so, the new voxel became the seed point and the process was repeated. The segmentation threshold chosen was −675 HU. Empirically, it was found that use of higher thresholds generally resulted in increased segmentation leakage.

The tortuous path length in the illustrated embodiment is determined by the generation of growth to which a particular voxel corresponds. Referring to FIG. 1, a simplified bronchus is shown with a seed voxel (104) placed in the tracheal lumen (106) (i.e. the main stem). The seed voxel is regarded as generation zero. The dark lines (108) indicate boundaries (e.g. the bronchial wall, or other tissue) having physical attributes outside the range that permits continued voxel spreading. Voxels spread from the seed voxel in successively numbered generations of voxel growth unless growth is stopped by a boundary (108).

Due to noise or otherwise, a segmentation leak (110) exists in the upper right arm of the illustrated bronchus. Voxels spread from this leak back down along the outside of the structure. In the illustrated embodiment, a generational limit of 16 is imposed on voxel spreading, so after the $16^{th}$ voxel (112), growth stops. Note that the terminal, $16^{th}$ generational voxel illustrated in the drawing is just 3 voxels away from the seed voxel in the x dimension, and 4 voxels away in the y dimension. If prior art volume constraints had been applied to such leakage, it would not have been arrested until it was 16 voxels away in one of the x, y, or z dimensions—far off the illustrated page. Thus, by the present arrangement voxel leakage is greatly reduced as compared with prior art techniques.

Voxels spread throughout the illustrated bronchus until this generational growth limit is met, or unless localized growth is stopped earlier due to a boundary having a physical attribute outside the specified range.

Desirably, several initial seeds are placed in the bronchus. One in the tracheal lumen, as illustrated. Others are typically placed within lobar bronchi. The use of multiple seeds allows greater control of the segmentation and contributes to the amount of segmentation leakage (by permitting lower generational limits).

Figure 2:
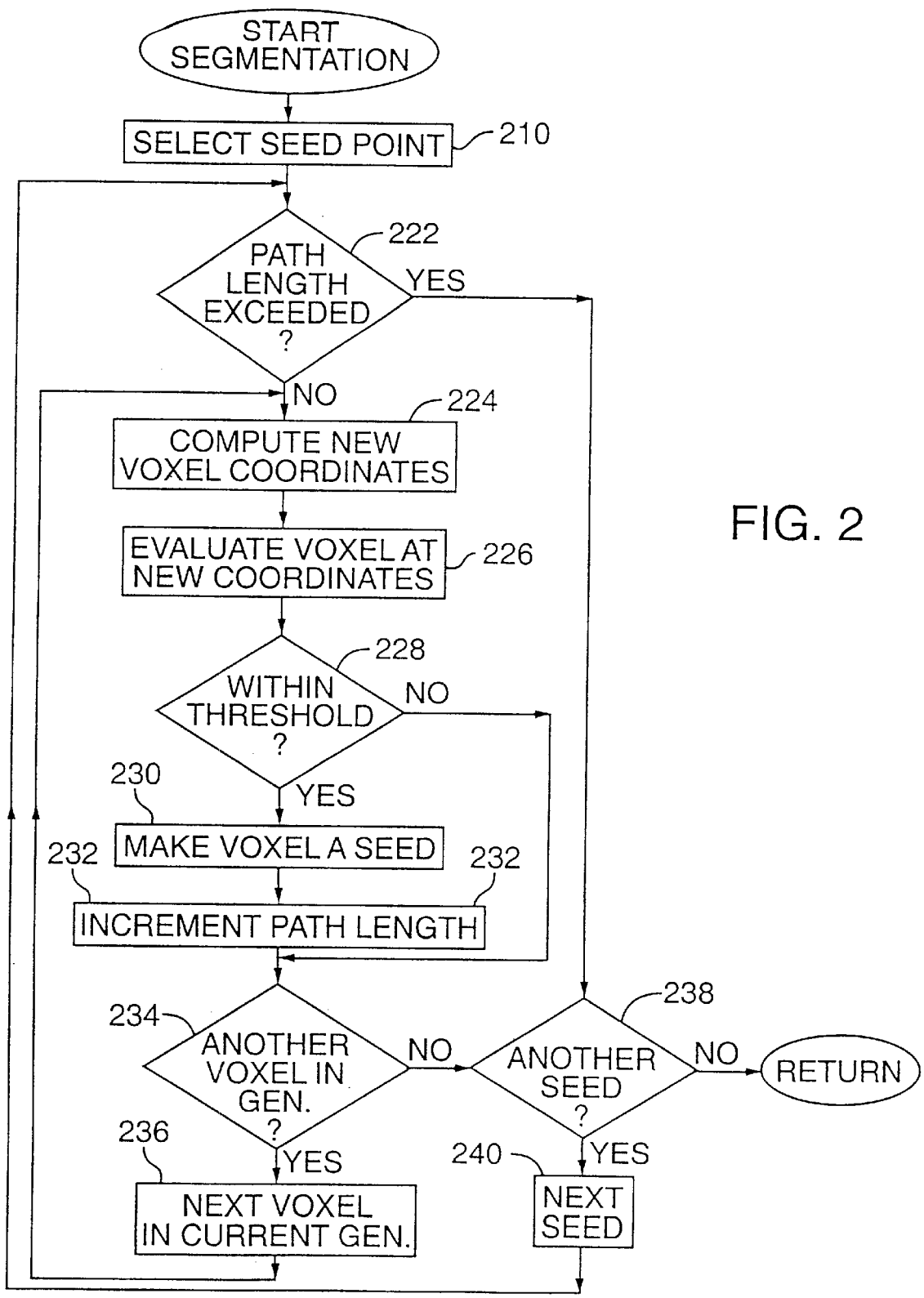
FIG. 2 is a flow diagram illustrating a region growing segmentation method that employs a path length limit to constrain voxel growth.

FIG. 2 is a flow diagram illustrating the operation of the segmentation method illustrated in FIG. 1. In the first pass, the segmentation process begins with the initial seeds placed in the airway. The process selects a seed point (210), which initially represents generation zero or a path length value of zero. In subsequent generations of growth, the process increments the path length value of new seed voxels, and the path length limit serves as a constraint on further processing of the segmented region at the new seed voxels. To avoid further processing in these cases, the process evaluates the accumulated path length (222), and if it exceeds a path length limit, the process terminates further growth originating from the current voxel. Processing then continues so long as other seed voxels remain.

If the path length is not exceeded, the segmentation process computes the new voxel coordinates of a voxel location that represents the next generation of growth from the voxel currently acting as the seed (224). As described above, the coordinates of the current seed are modified to compute a new voxel location. The specific location of each new voxel computed from the current seed depends on the desired rate and direction of growth from the voxel.

The characteristic value of the voxel at the new coordinates is evaluated (224) to determine whether it falls within a predetermined threshold (228). Typically the characteristic value represents an intensity or radiological density value, but can also represent other characteristic data. If the characteristic value is within the threshold, the new location becomes a potential seed voxel in a subsequent generation of growth (230). The segmentation process tracks the path length to each new seed voxel by incrementing the path length value representing the number of generations of growth to the new seed (232).

Since several new voxels are potentially evaluated in the current generation of growth from a voxel (i.e. the six adjacent voxels), the segmentation process continues to process any additional voxels in the current generation as reflected in steps 234 and 236. Once there are no more voxels in the current generation of growth, the segmentation process proceeds to another seed voxel as shown in steps 238 and 240. This new seed voxel may be one of the initial seeds or a seed created in an earlier generation. Processing halts when there are no additional seeds.

In a further refinement, a directional criteria is employed for the region growing process. This involves ratioing the relative rates of growth in the left, right, anterior, posterior, superior and inferior directions, so growth proceeds slowly in directions where little growth is expected. Consider, for example, a situation in which a unity growth factor is applied in the superior and inferior directions, and a growth factor of 0.5 is applied in the other four directions. Starting with the seed voxel, the process begins by consideration of just the superior and anterior faces of the seed voxel. Two voxels are thereby identified in this first generation of growth (assuming a physical characteristic within the specified range). In the second generation of growth, all faces of the two voxels identified in the first generation are considered, together with the four faces of the seed voxel not considered during the first generation of growth.

This process continues, with odd generations of growth considering only voxels superior or anterior to those just identified, and the even generations of growth considering adjoining voxels in all six directions. By this arrangement, voxel growth spreads twice as quickly along the superior-inferior axis as along the others.

In this ratioed growth context, the tortuous path limit is still keyed to total generations of growth, notwithstanding that growth does not occur in all directions during each generation.

The effects of such ratioed growth on leakage are illustrated by FIG. 3. Growth in the vertical directions proceeds in every generation; growth in the horizontal directions proceeds only in even numbered generations. As a consequence (in this example), growth does not extend to a voxel horizontally adjacent to an even generation voxel until the succeeding even generation of voxel growth. Comparison of FIG. 3 with FIG. 1 shows that the leakage is arrested earlier.

As interesting as the early arrest of leakage is the fact that such ratioing has very little effect on the rate of voxel growth through the intended structure (none in the illustration). Because the width of the bronchial structure is less than twice its height, the half-paced growth in the horizontal direction does not impair the spread of voxels through the desired structure.

Figure 4:
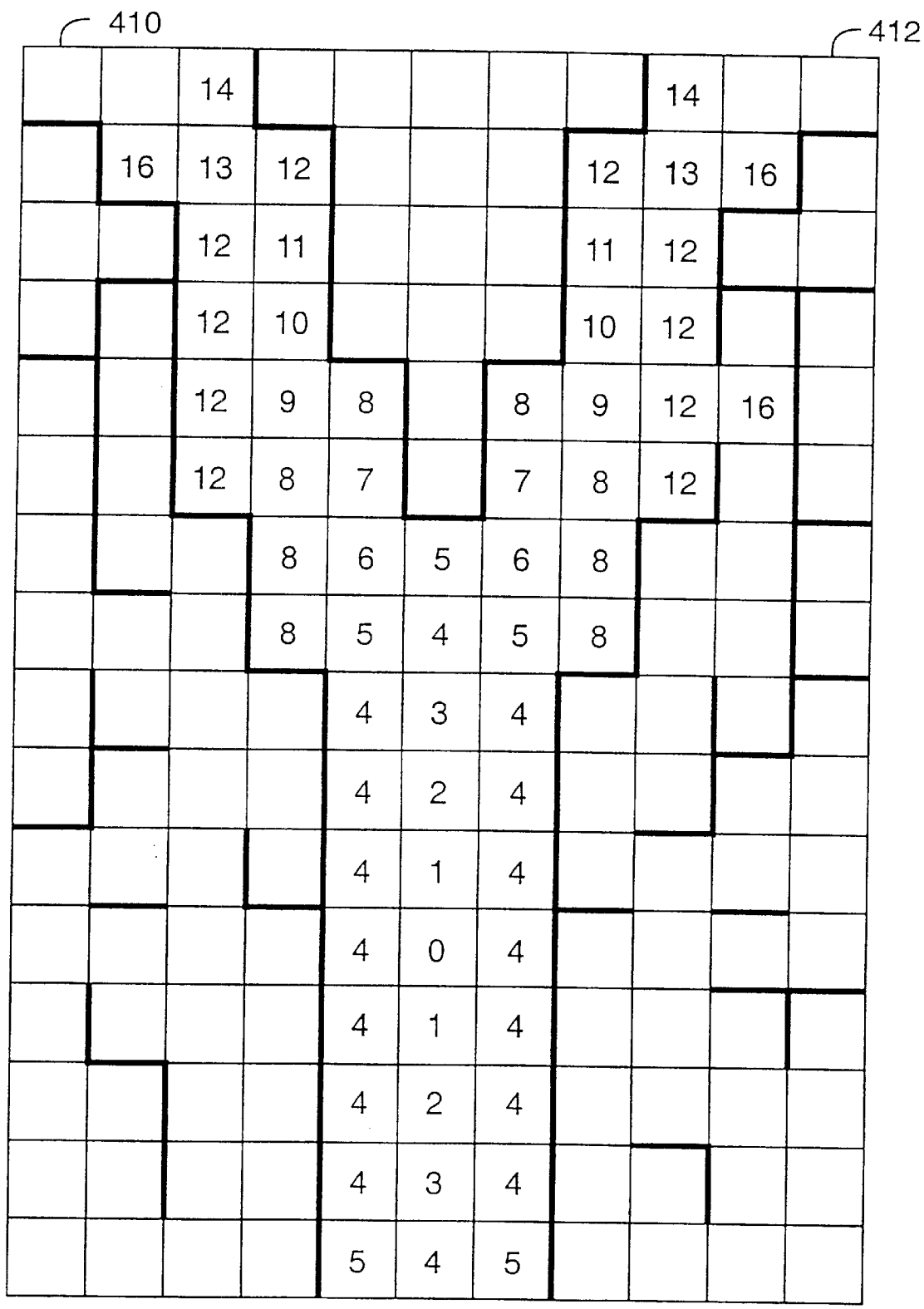
FIG. 4 is a voxel map showing another example of ratioed growth.

If the aspect ratio of the desired structure is exaggerated, the ratioed growth causes both leakage and desired voxel spread to be curtailed. In FIG. 4, for example, growth in the horizontal direction occurs only every fourth generation. In this case, leakage is arrested still earlier (only a single voxel of leakage in this example), but at the price of a shortening of the part of the desired structure. (e.g., the voxels in the two upper corners (410, 412) of FIG. 4 are not reached in 16 generations of growth.) This latter price can be ameliorated by selecting more closely spaced initial seed locations through the structure. Different growth ratios can be applied to each seed.

For example, a posterior segmental bronchus in the right lower lobe tends to be oriented in the inferior direction, so any propagation of region growing in the five other directions likely relates to leakage and can be minimized by ratioing accordingly. Similar logic can be applied to each of the twenty-some segmental bronchi.

Further consider segmenting a lobe. Bronchi in that lobe tend to ramify in a particular preferred direction (away from the hilum). So right upper lobe bronchi tend to ramify to the patient's right side and in a superior direction. Bronchi in the right middle lobe tend to ramify to the right and/or anteriorly. Right lower lobe bronchi ramify inferiorly and to the right. Left upper lobe bronchi ramify superiorly and to the left. Lingular bronchi ramify to the left. Left lower lobe bronchi ramify interiorly and/or to the left.

There is an evident balance to be struck between the number of seeds and the tortuous growth limit (and the ratioing of directional growth). A suitable starting point is usually to specify between one and four seeds. The first is located in the proximal trachea, with a tortuous growth limit of 500 generations (this corresponds to 250 millimeters with a half millimeter voxel dimension), and equal growth in all directions. This arrangement is used as a trial to determine how many bronchi are segmented and how much leakage has been encountered. Then the growth limit can be reduced, the ratios can be adjusted asymmetrically, and/or a new seed can be placed.

If a second seed is added at the level of a lobar bronchus, a tortuous growth limit of 20–100 generations may be set (typically 40), with ratioed growth favoring the principal axis by a factor of two.

It will be recognized that ratioed growth can be implemented in various ways; the foregoing is simply illustrative.

In addition to the tortuous growth limitation, a conventional parallelepiped constraining volume can also be employed, in case growth in the leakage volume does not follow a chaotic path.

Desirably, the software provides a convenient graphical user interface through which the foregoing parameters can be interactively adjusted in accordance with segmentation results as displayed in near real-time on associated display devices.

After segmentation is completed, 3D surface rendering is generated by application of an isosurface algorithm. With this method, eight adjacent voxels that share a common vertex are used to create a virtual cube. The voxel intensity of each of the eight voxels is assigned to the corresponding vertex of the virtual cube. Given these vertex intensities, a surface is created through this virtual cube that represents the desired isosurface. Thus, to generate an appropriate isosurface, gray-scale values of wall-surface voxels at least two voxels deep are provided to the algorithm. The remainder of the 3D array is filled with a large constant value. Therefore, when wall voxels are detected during the segmentation, the gray-scale value of the wall voxel and a voxel beyond the wall are transferred to an array. Placement of the additional voxel beyond the wall allows flexibility in the choice of the isosurface threshold. A threshold value near that of the segmentation threshold places the wall partially through a lumen voxel. Use of a higher isosurface threshold moves the wall surface out just beyond lumen voxels and places the surface completely through wall voxels. The resulting array, after segmentation, is passed to the isosurface algorithm to generate the desired surface.

The isosurface algorithm also necessitates use of a threshold to determine the location of the isosurface in the virtual cube. A value of −380 HU is used for this threshold in the illustrated embodiment. Initially, a threshold value of −500 HU was used, but it was found that this setting tended to result in underestimation of bronchial diameter. This is in keeping with the range suggested by Zeiberg et al., "Helical (Spiral) CT of the Upper Airway with Three-Dimensional Imaging," AJR 166:293–299 (1996), who found in phantom experiments that measurement errors were reduced for thresholds in the range of −500 to −300 HU.

Figure 5:
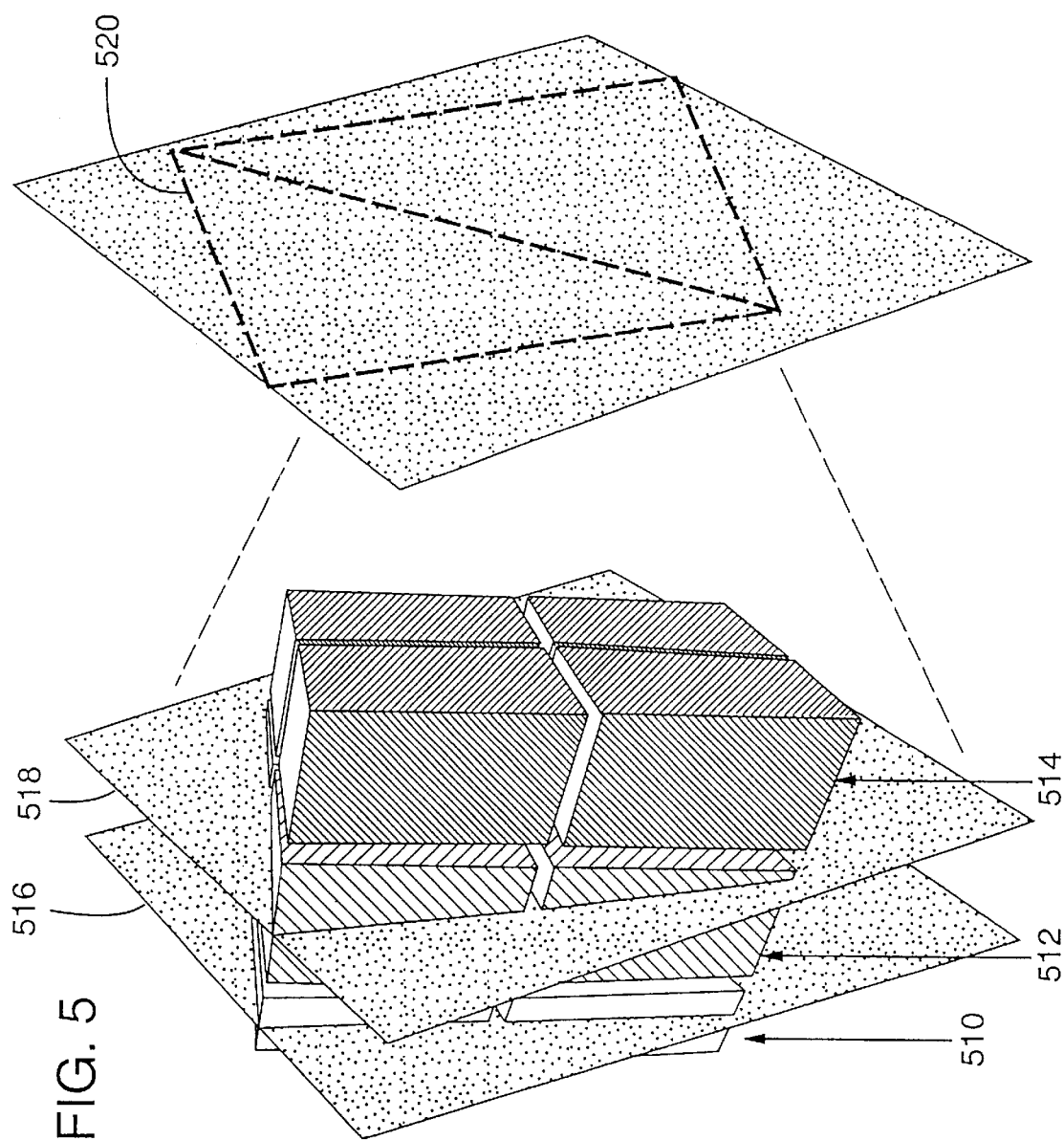
FIG. 5 shows how a bronchial wall can be located from CT data according to one embodiment of the present invention.

The foregoing may be made clearer by reference to FIG. 5. This illustration shows how the bronchial wall is located from the CT data. Three adjacent columns (510, 512, 514) of voxels are illustrated in the Figure, with different shadings given to each. The four darkest voxels (514) are within the bronchial lumen. Gray voxels (512) are partially within the voxel wall. White voxels (510) are entirely within the bronchial wall. The position of the wall (shown as a plane traversing the voxels e.g., planes 516 and 518) is determined by the isosurface threshold. Increasing the isosurface threshold moves the wall further to the left in the Figure. The patch (520) of the wall that intersects the voxels is triangulated in the right part of the Figure. This process is repeated for each small patch of the wall.

Figure 6:
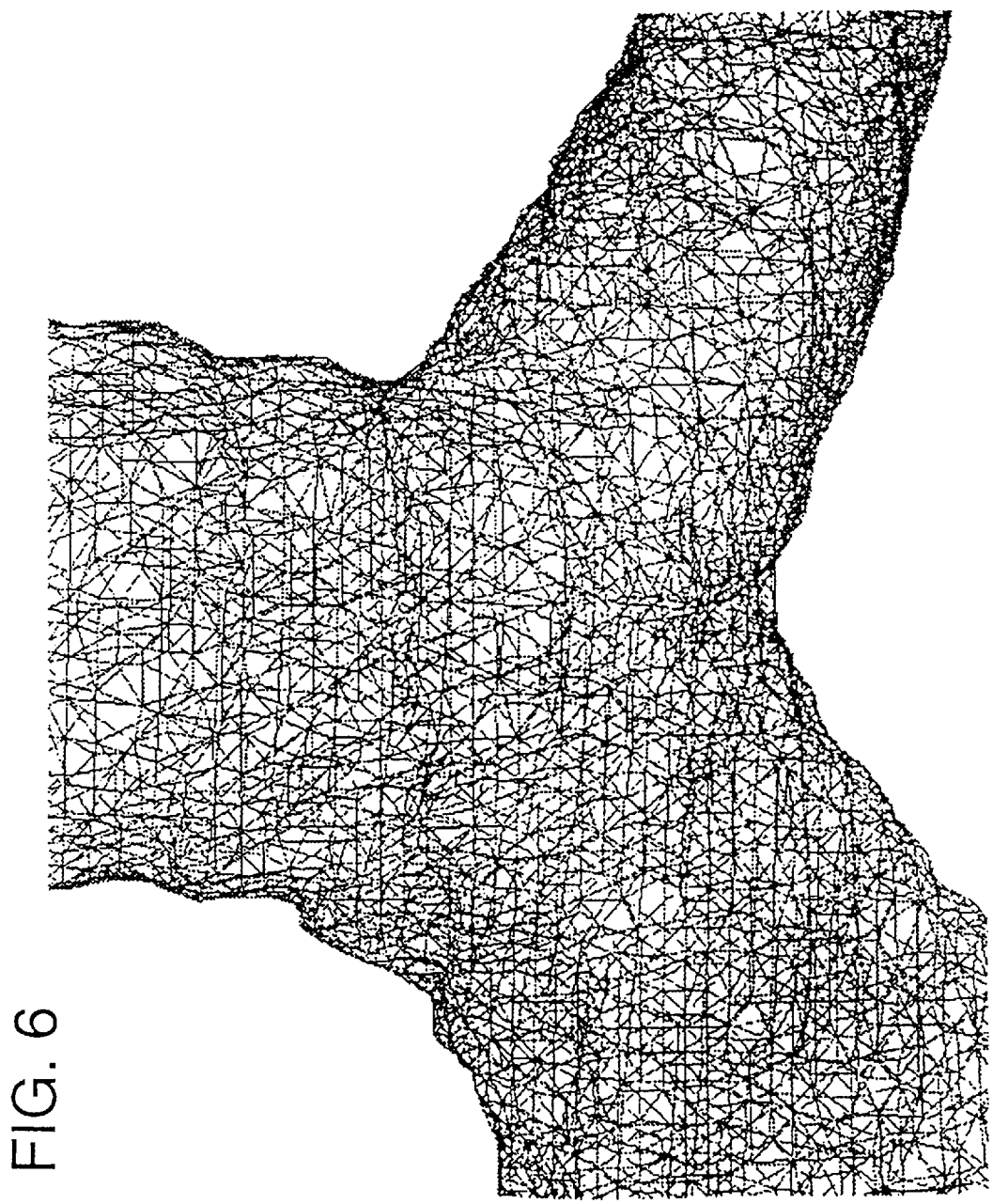
FIG. 6 shows an excerpt of a 3D model of the bronchus composed of a myriad of tiny triangles.

In the preferred embodiment, the model surface is composed of many tiny triangles, as shown in FIG. 6. As a final step in processing of data, the 3D bronchial model is compressed by using a process known as triangle decimation. This method increases the display frame rate by reducing the number of triangles needed to form flat parts of the model, but it preserves the global morphologic characteristics. A decimation tolerance level of 0.1% can be used.

The segmentation algorithm described above was written and implemented by using an Indigo II computer with Extreme graphics (Silicon Graphics, Mountain View, Calif.). This computer has 320 Mbyte of main memory and a 9-Gigabyte disk drive. We interfaced this software with a commercial visualization package, which was used to render and manipulate the shaded surface display (Explorer Version 3.0; Numerical Applications Group, Downers Grove, Ill.).

The Explorer program has a viewer that allows a "fly through" of any 3D data set. The fly-through capability is used to simulate bronchoscopy, as more particularly detailed below. Image compression was achieved by using IMCompress (InnovMetrics Software, Quebec, Canada).

Method of Image Analysis

To illustrate that the 3D surface rendering achieved by the foregoing technique is a true representation of the two-dimensional CT data from which it was derived, bronchial dimensions on both the CT images and the surface-rendered models were measured for four patients. The source CT data were analyzed at a graphics workstation by using the Advantage Windows program (GE Medical Systems). Coronal, sagittal, and axial localizer images were generated from the 3D volume set. The window level was set at −150 HU, and the window width was set at 1,000 HU. The orientation of each bronchus was determined by obtaining a section that included the bronchus within its plane; from this image, a section perpendicular to the lumen was generated. From this section perpendicular to the bronchial cross section, the maximum and minimum diameters were measured. To simplify the analysis, the bronchial cross section was modeled as an ellipse, with the minimum diameter placed along an axis perpendicular to that of the maximum dimension. This assumption was probably of greater validity in segmental bronchi and of lesser validity in the trachea, in which the incomplete cartilage ring resulted in a cross-sectional shape that was not a classic ellipse. In the trachea, main-stem bronchi, bronchus intermedius, and lobar bronchi measurements were made in the proximal, middle, and distal portions of the bronchus. Only a proximal measurement was made in the segmental bronchi. There were therefore 49 potential locations at which measurements could be made in each patient. All measurements were made by the same observer. The measurements were repeated at three different reading sessions, so a total of three measurements of each dimension were obtained at each site for a total of 294 measurements per patient. The bronchial cross-sectional area was computed from the equation of an ellipse: nab, where a and b are the major and minor semiaxes, respectively.

The 3D surface-rendered models were analyzed using the Silicon Graphics workstation. Software was developed to make linear measurements in the interior of the model. We implemented pick correlation to identify locations on the bronchial wall. Pick correlation was used to locate the coordinates of a point on the bronchial wall (selected by clicking a mouse). The Pythagorean theorem was then applied in a straightforward manner to compute the distance between any two locations on the wall. These measurements were then calibrated in centimeters, on the basis of voxel dimensions of the source CT data. While the observer traversed the 3D model during a simulated bronchoscopic examination, locations in the proximal, middle, and distal portions of the larger bronchi and in the proximal portions of the segmental bronchi were again selected for measurement. To determine the appropriate measurement plane, the line of sight was set interactively to point along the orientation of the bronchus. The maximum and minimum dimensions were measured within a plane perpendicular to the view direction. Measurements were performed three times at each site to determine intraobserver variability.

Method of Statistical Analysis

Analysis of the bronchial diameters and cross-sectional areas determined at CT and at VB was performed. Because the true diameter and area value were unknown, the method of Bland and Altman ("Statistical Methods for Assessing Agreement Between Two Methods of Clinical Measurement," Lancet, Vol. 1, pp. 307–310 (1986)) was employed to assess the level of agreement between the CT and VB measurements. The difference between the measurements obtained with each technique was compared with the average measurement obtained with the two methods. This comparison was more illuminating than a correlation coefficient because the latter showed the CT and VB measurements to be highly correlated, a finding that was expected because the VB is derived from the CT data. According to Bland and Altman, the VB measurements are interchangeable with the CT measurements if twice the standard deviation of the differences (which encompass 95% of the data) is not clinically important.

Results

Imaging was well tolerated by all 14 patients. Of the total bronchi expected to be visible, 91% and 82% were measurable with CT and VB, respectively. CT demonstrated 85% and VB showed 76% of segmental bronchi. A bronchus was considered measurable at VB if the proximal portion of the bronchus was visible and could be entered during the fly-through. Overall, 90% of bronchi through the third order that were measurable at CT could be measured at VB. Among the total of 196 bronchial measurements, 175 could be made on the CT images (89%) and 153 could be made on the VB renderings (78%). The most difficult bronchi to measure were the superior and inferior lingular segmental bronchi. This difficulty was probably a result of their small size and obliquity to the place of section and of the presence of cardiac pulsation artifacts.

The mean differences between the measurements of maximum lumen diameter and the measurements of lumen cross-sectional area with CT and VB are listed in Table 1. Given the segmentation and isosurface thresholds chosen, VB (compared with CT) tended to result in overestimation of lumen diameter and cross-sectional area by less than 0.5 mm and 5 $mm^2$ on average, respectively. To detect systematic errors associated with bronchus size, the differences in lumen diameter and cross-sectional area were also expressed as a percentage of the mean difference between the CT and VB measurements. These percentages were typically less than 10%, and there was no apparent correlation with bronchus size ($P>0.05$).

TABLE 1

Differences in Measurements of Diameter and Area of Bronchal Lumen with CT and VB

| Patient No. | Mean Difference in Maximum Diameter (mm) | Mean Different in Area ($mm^2$) |
| --- | --- | --- |
| 1 | −0.3 (0.3) | −2.3 (4.3) |
| 2 | −0.1 (0.4) | −2.2 (5.7) |
| 3 | −0.2 (0.4) | −4.3 (6.9) |
| 4 | −0.1 (0.4) | −2.9 (4.6) |

The number of triangles in the 3D surface-rendered models of the 14 patients' airways and the approximate frame rates in the trachea are listed in Table 2. The number of triangles gives a sense of the complexity of each 3D model, and the frame rate is an indication of the ability to interactively manipulate the model in real time. We found frame rates of one to two frames per second to be adequate for this application. Three of the models comprised more than 100,000 triangles and had rendering speeds of less than one frame per second. In these three patients, the models contained large cavities, which increased the number of triangles dramatically. If only the airways were of interest, the cavities could be eliminated from the model and the rendering speeds would increase. Table 2 details rendering speeds for different analyses.

TABLE 2

Patient Information and Rendering Speeds for VB

| Patient No/ Age (y) Sex | Clinical Data | No. of Triangles | No. of Seeds | Frame Rate in Trachea (frames per second) |
|---|---|---|---|---|
| 1/24/M | WG | 67,000 | 4† | 1.5 |
| 2/39/M | WG | 51,000 | 4 | 2.0 |
| 3/35/M | WG | 84,000 | 4 | 1.3 |
| 4/28/M | CGD | 65,000 | 6† | 2.4 |
| 5/54/F | WG | 63,000 | 3 | 1.7 |
| 6/19/F | WG | 49,000 | 3 | 2.2 |
| 7/45/F | RP | 47,000 | 3 | 2.0 |
| 8/67/F | LG | 99,000 | 1 | 1.2 |
| 9/22/F | JS | 103,000 | 5† | 0.8 |
| 10/22/F | JS | 60,000 | 3 | 1.9 |
| 11/52/F | MAI | 184,000 | 7† | 0.7 |
| 12/25/F | JS | 199,000 | 8† | 0.8 |
| 13/37/F | MDRTB | 108,000 | 6† | 1.5 |
| 14/38/F | JS | 21,000 | 1 | 3.3 |

(CGD = chronic granulomatous disease, JS = Job syndrome, LG = lymphomatoid granulomatosis, MAI = Mycobacterium avium-instracellulare, MDRTB = multiple drug-resistant tuberculosis, RP = relapsing polychondritis, WG = Wegener granulomatosis.
*Worst-case frame rate. The frame rate increases dramatically in the smaller airways.
†Includes one or more cavities.)

(CGD=chronic granulomatous disease, JS=Job syndrome, LG=lymphomatoid. granulomatosis, MAI=*Mycobacterium avium-instracellulare*, MDRTB=multiple drug-resistant tuberculosis, RP=relapsing polychondritis, WG=Wegener granulomatosis. *Worst-case frame rate. The frame rate increases dramatically in the smaller airways. †Includes one or more cavities.)

Standard deviations of the diameter measurements were slightly larger for VB; they were typically less than 0.25 mm for CT and less than 0.35 mm for VB. The slightly greater standard deviation for VB measurements was attributed to the fact that selection of wall points was less reproducible with VB than with CT.

In other tests, results of fiberoptic bronchoscopy were compared with the virtual bronchoscopy findings. Lesions due to Wegener granulomatosis were noted in the VB analysis. Findings with fiberoptic bronchoscopy confirmed the lesions. One of the lesions was 5.1 mm wide. The patient with this lesion also had a tight stenosis in the bronchus intermedius. The diameter of the lumen was 3.0 mm±0.3 at CT and 3.2 mm ±0.1 at VB. The length of the stricture was 9.8 mm±0.2 at VB. A fiberoptic bronchoscope could not be passed through this stricture. VB views of the lumen proximal and distal to the stenosis were also obtained. This segment could not be visualized at fiberoptic bronchoscopy.

VB imagery was also taken of a patient with chronic granulomnatous disease. Large cavities were noted in both upper lobes. For each cavity, a macroscopic site of communication was detected between a segmental bronchus and the cavity. Segmentation of the cavities alone showed that the volume of one cavity was 13.6 mL and of the other was 24.1 mL.

Processing of an examination necessitated approximately 1 hour and consisted of iteratively varying the tortuous distance parameters and number of seeds to attain the desired level of completeness of visualization of the tracheobronchial tree (i.e., to see more third-order bronchi). At least 75% of this time was spent waiting for the computer to perform the segmentation. Processing time could thus be reduced substantially by using a faster computer and by further optimizing the algorithm.

Discussion

The above-detailed segmentation method produces realtime, detailed, shaded surface displays of VB. Although the segmentation can be time-consuming, owing to the necessity for trained operator intervention, the detailed method ameliorates the problem of segmentation leakage and thereby reduces the number of triangles that needed to be rendered; the net result is a real-time interactive display. This method allows visualization of bronchi to the third order (segmental bronchi) and optimizes both image quality and viewing speed.

Once the airway model is formed, it is possible to make many 3D size measurements and to view the entire airways quickly and in detail during fly through up and down the different bronchi. A comparable speed capability has been suggested in which cine mode is used to page through a large number of transaxial images (Gur et al, "Sequential Viewing of Abdominal CT Images at Varying Rates," Radiology, 191:119–122 (1992). The cine method was proposed for detection of abdominal masses, but its usefulness has not been established for the detection of abnormalities in the thorax. Virtual endoscopy is a recently developed technology, and there are few data reported that describe its time-saving aspects. Cline et al. ("Three Dimensional Segmentation of MR Images of the Head Using Probability and Connectivity," J. Comput. Assist. Tomography, 14: 1037–1045 (1990))report that a method of tissue segmentation with magnetic resonance (MR) imaging of the brain necessitated only 5 minutes of user interaction. Their method employs a multispectral analysis (several MR sequences), yielding greater tissue contrast than is provided at CT. In an earlier study by the same group, presumably at an earlier stage of development of the technology, a processing time of 1 hour was reported for segmentation of the brain. In a study of 3D reconstruction of the upper airway, development of a model took less than 10 minutes. None of these methods, however, reportedly allowed virtual endoscopy to be performed in real time. The amount of operator time necessary with the above-described method appears reasonable given the early stage of development of the method, which is expected to be amenable to further automation. Because of the large number (several hundred) of images in a typical dat set, this method is expected to be faster and more accurate than interactive editing of individual sections.

The problem of segmentation leakage is most important in the lung periphery adjacent the segmental bronchi. At these locations, bronchial dimensions are on the order of the section thickness, and partial-volume artifacts can cause artifactual holes in the bronchial walls. The segmentation algorithm tends to leak through these holes and thus generate unwanted surfaces of pulmonary arteries and veins. A large number of unwanted surfaces can be generated in this way within a short distance of the structure of interest. By reducing the tortuous distance parameter, this segmentation leakage is controlled. More distal portions of segmental bronchi—outside the generational limit—are handled by establishing additional seed locations in such distal portions.

In the illustrated embodiment, a compromise is reached between the desire to include smaller segmental bronchi in the reconstruction and the need to reduce the number of triangles in the model. It was found that for a display field of view of 26 cm, a tortuous distance limit of 250 voxels from a seed voxel in the trachea at the level of the thoracic inlet is a good starting point for reconstructing the majority of the bronchi through the level of the proximal segmental bronchi.

At CT and VB, 91% and 82%, respectively, of the total bronchi expected to be visible were actually measurable. Measurements could be made at CT in 85% and at VB in 76% of segmental bronchi. These values are in reasonable agreement with those of Osborne et al. ("CT Identification of Bronchopulmonary Segments," AJR 142:47–52 (1984)), who reported that 70% of segmental bronchi were visible. They also used a 10-mm section thickness; one would therefore expect that in the present system more bronchi could be expected to be visible due to use of 3-mm-thick sections. The requirement that a bronchus be not only visible but also measurable in the above-described setup is more stringent than their requirements, and so the percentage could be expected to be reduced. The main factors that reduced the visibility of bronchi at VB were use of a distance parameter that was too small during segmentation, the presence of bronchi with lumen attenuation substantially higher than that of air (because of partial-volume effect, noise, or intraluminal filling defect), the presence of bronchi that were obliterated by stricture, and a decrease in the attenuation of the bronchial wall (caused by partial-volume effect and motion artifact as a result of respiratory or cardiac motion). These factors help explain the slightly lower percentage of bronchi measurable at VB compared with at CT. The bronchi that were most difficult to visualize were the lingular segmental bronchi. This finding is in agreement with other reported research. If the requirement to visualize bronchi were relaxed so that only trachea and bronchi to the second order would be rendered, the number of measurable bronchi would increase to 100% at CT and 94% at VB. It is likely that this is a more clinically relevant criterion.

It is difficult to accurately measure lesion width or length through the fiberoptic bronchoscope because of magnification problems, although in principle these magnification problems can be corrected. The technique described above makes such measurements easy once the 3D model has been generated.

Another approach to generating VB displays is to use so-called robot path-planning techniques. In this method, the initial and final locations of a one-way bronchoscopic trip through the airway are designated. Distances from a starting voxel to each voxel in the lumen are computed, and a path of steepest descent is determined. The path of the fly through is computed, and VB is rendered off line. The resulting static images are combined into a movie, which can be run forward or backward. In principle, this technique can be used to generate VB of the entire airway by planning paths through each bronchus. One drawback to this technique is that the digital movie files can be very large, on the order of hundreds or thousands of megabytes. The present arrangement, in contrast, generates files on the order of 5 Mbyte. Perhaps a more serious problem is that the advantage of real-time interactivity is lost. With real-time interactivity, lesions can be quickly viewed from a variety of perspectives, and these perspectives can be matched with those obtained at actual fiberoptic bronchoscopy. Also, it is difficult to generate the global view of the airways when a robot path-planning technique is used because a clear view of the entire bronchial system is not generated.

Threshold-based segmentation schemes, such as used in the illustrative embodiment, have known limitations, including sensitivity to partial-volume effects and to the choice of reconstruction algorithm and threshold settings. The imaging parameters (section thickness, pitch, milliampere-second settings) may also need to be optimized. For example, the resolution along the z axis could be improved by reducing the helical pitch to 1:1, although this normally would result in decreased anatomic coverage per breath hold with current scanner technology.

In the illustrative embodiment, different threshold settings were used for the multiplanar reconstructions and 3D models. Different settings were used to retain detail in reconstruction of the bronchial wall; this detail might be lost with use of a larger window width setting. The use of different threshold settings may account for the slight overestimation of lumen diameter and cross-sectional area at VB compared with at CT. Further optimization of threshold settings will be necessary to optimize the use of VB for distance measurements.

The 3D models we produces were stored in a standard file format called Open Inventor (Silicon Graphics). Recently, a specification for a file format has been developed for virtual reality distributable over the Internet and based on Open Inventor and is called the Virtual Reality Modeling Language, or VRML. Open Inventor models are readily converted to the format of Virtual Reality Modeling Language. The practical consequence of this development is that VB models can be viewed on any computer connected to the Internet by using publicly available browser software. The real-time display, however, still necessitates use of special graphics hardware.

The methods detailed in this disclosure are general and are applicable to any structure, and are particularly well suited to segmentation of complex branching structures (e.g. the vasculature, biliary tree, and intrarenal collecting system). The segmentation method is not limited to human anatomical structures, but instead, also applies to other hollow structures including mechanical devices such as pipes, and other biological structures such as plants.

Rendering speeds of graphics hardware are expected to continue to increase rapidly, as has been the case in the past. Improvements in segmentation software are also expected and should reduce the amount of intervention necessary by trained operators to produce the 3D models. Routine performance of VB for enhanced analysis of endobronchial disease, cavitary lung disease, and bronchiectasis will then become a practical reality.

Additional information on the foregoing technique, including photographs, can be found in Summers et al, "Virtual Bronchoscopy: Segmentation Method for Real-Time Display," Radiology, 200:857–862 (1996).

Computer-aided Guides

As noted above, it is possible to interactively navigate a three-dimensional reconstruction of the bronchial tree to effect a virtual bronchoscopy (VB). Further computer processing of the image data allows compilation of a guide that serves to aid, or direct, a physician in his review of the bronchial tree. (Manually evaluating the entire bronchogram is time consuming and lesions may be missed due to fatigue.)

This guide recognizes polypoid airway lesions by segmenting the bronchial surface based on particular curvature classifications. Our implementation of this guide employs locally invariant quantities called the first and second fundamental forms. These first and second forms are functions of the partial derivatives of a parameterized surface and of a surface displacement vector. Some implementations may also make use of additional local surface descriptors including the tangent plane, the unit normal, and the normal curvature. The following discussion further details the preferred forms of mathematical analysis.

The "normal curvature represents" the curvature at a point p on a surface. It is defined to be the ratio of the second and first fundamental forms and varies as a function of the direction of the surface displacement vector. The extrema of the normal curvature at point p as a function of direction are termed the minimum ($\kappa_m$) and maximum ($\kappa_M$) "principle curvatures" and are oriented in the "principle directions." Additional useful quantities are the "mean curvature" $H=(\kappa_m+\kappa_M)/2$ and "Gaussian curvature" $K=\kappa_m \kappa_M$. These latter quantities are invariant to arbitrary transformations of the parameterization and invariant to arbitrary rotations and translations. These curvature quantities are also viewpoint independent, another important feature.

The mean and Gaussian curvatures can be computed from the following equations, which are functions of the vector S describing the surface and its partial derivatives.

$$A = \overline{Q} \cdot \overline{S_{uu}}$$

$$B = \overline{Q} \cdot \overline{S_{uv}}$$

$$C = \overline{Q} \cdot \overline{S_{vv}}$$

$$\overline{Q} = \overline{S_u} \times \overline{S_v}$$

$$H = \frac{A|\overline{S_v}|^2 - 2B\overline{S_u} \cdot \overline{S_v} + C|\overline{S_u}|^2}{2|\overline{Q}|^3}$$

$$K = \frac{AC - B^2}{|\overline{Q}|^4}$$

where the subscript notation indicates partial differentiation, e.g.

$$\overline{S_u}(u, v) = \frac{\partial \overline{S}}{\partial u}$$

The vector Q is parallel to the surface normal.
The principle curvatures can then be computed from $$b=\sqrt{H^2-K}$$

and $\kappa_m$=H−b, and $\kappa_M$=H+b.

These curvatures are important because they can be used to classify surface shape. Based on the sign of K, $\kappa_m$ and $\kappa_M$, the surface can be classified locally into 3 major shapes: elliptical, hyperbolic, or cylindrical, as shown in Table 3.

TABLE 3

| Class | Shape | H | $\kappa_m$, $\kappa_M$ | K |
|---|---|---|---|---|
| Elliptical | Peak, Pit | <0, >0 | same sign | >0 |
| Hyperbolic | Saddle Point | varies | opposite sign | <0 |
| Cylindrical | Ridge, Valley, Plane | <0, >0, 0 | one or both zero | 0 |

Figure 7:
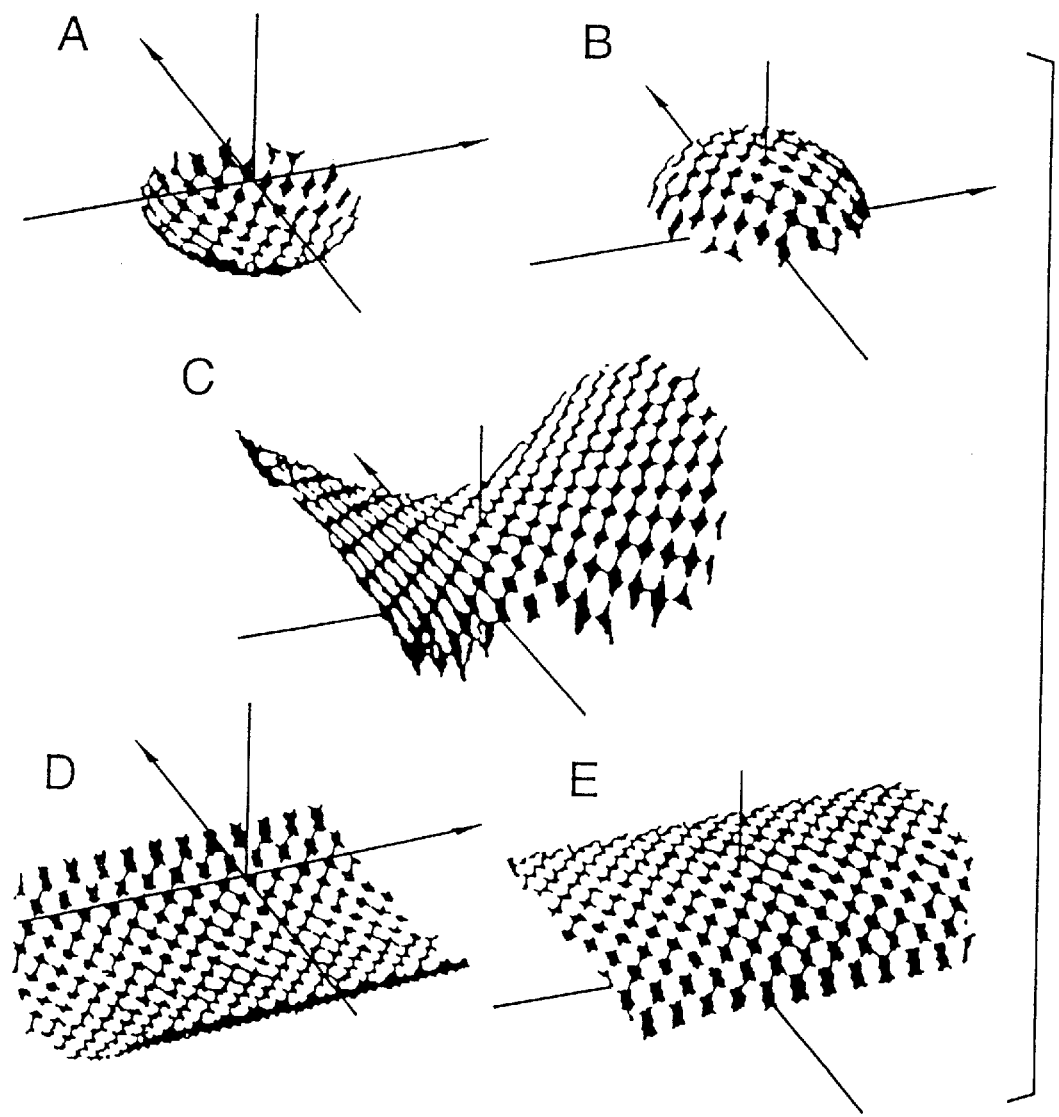
FIGS. 7A–7E illustrate different curved surfaces.

FIG. 7 shows different types of surface curvatures. FIG. 7A shows elliptical curvature of the pit type; FIG. 7B shows elliptical curvature of the peak type; FIG. 7C shows hyperbolic curvature (saddle point); FIG. 7D shows cylindrical curvature of the valley type; and FIG. 7E shows cylindrical curvature of the ridge type.

Normal (lesion-free) bronchial walls can be characterized by surfaces of hyperbolic and cylindrical shape, or of elliptical shape of the pit variety. Polypoid lesions which are of interest to the clinician are of elliptical curvature of the peak subtype. For example, a spherical polypoid lesion of radius r has elliptical curvature of the peak type and its mean and principle curvatures are identical: 1/r (neglecting the lesion edge, which may have higher curvature where it meets the bronchial wall). A spherical crater or ulceration of radius r has elliptical curvature of the pit type and its mean and principle curvatures are −1/r. The Gaussian curvature of both lesions is the same: $1/r^2$.

In our implementation that uses patch fitting to analyze curvature, it is sometimes necessary to smooth the surface model before beginning curvature analysis. For example, when the surface model is generated from the segmented structure as described above, a smoothing routine smooths the surface using 50 iterations of the smoothing algorithm of Taubin (SIGGRAPH, ACM, pp. 351–348 (1995)). Next, a biparametric fourth order b-spline patch is fit to local neighborhoods of radius 5 mm. The first and second order partial derivatives of the fitted patch are then computed. The vertex is then classified according to the scheme of Table 3. Vertices in regions of hyperbolic and cylindrical curvature are discarded. Only vertices in regions of elliptical curvature with positive mean curvature above a threshold ($\epsilon$) are retained. This process is repeated for each vertex on the surface.

The processed vertices are filtered to discard isolated ones or those comprising lesions smaller than a specified minimum size arbitrarily chosen to be 30 vertices (approx. 5 mm diameter). Lesions are then defined as a cluster of connected vertices sharing the desired curvature classification and exceeding the minimum size. Vertex connectivity is determined using a region growing process which begins with those local neighbors which form a triangle and proceeds recursively enlarged until it runs out of neighbors with the appropriate curvature classification. Lesion sites identified by the foregoing method can be noted in a virtual guide (e.g. a software construct with an entry for each potential lesion, noting its location and optionally other data, such as curvature parameters, size, etc.).

As an alternative to finding curvature characteristics using a parametric patch, the surface curvature of anatomical model can also be analyzed by applying a 3D filter to neighboring voxels of points on the surface. In this alternative approach, a 3D filter is used to compute partial derivatives at selected points on the surface, such as vertices in the tessellated surface model. The partial derivatives of the surface are then used to compute the curvature characteristics at each vertex. In particular, the partial derivatives are used to compute the minimum and maximum principal curvatures, the mean curvature, and the Gaussian curvature as described above.

In the literature, the 3D filters are sometimes referred to as Deriche filters. The expressions for the partial derivatives with respect to the spatial coordinate, x, are set forth below:

$f_0(x)=c_0(1+\alpha|x|)e^{-\alpha|x|}$(smoothing operator);

$f_1(x)=c_1 x\alpha^2 e^{-\alpha|x|}$(first derivative operator);

$f_2(x)=c_2(1-c_3\alpha|x|)e^{-\alpha|x|}$(second derivative operator)

The coefficients, $c_1$, $c_2$ and $c_3$, are normalization coefficients, which are chosen to ensure that convolution by the filters $f_0$, $f_1$ and $f_2$ yield the proper derivatives. The value of $\alpha$ controls the degree of smoothing.

These functions can be used as convolution filters on a discrete 3D data set such as a voxel array to compute smoothed zero, first and second derivatives. See O. Monga and S. Benayoun, "Using Partial Derivatives of 3D Images to Extract Typical Surface Features," *Comput Vision Image*

*Understand* 61, pp. 171–189, 1995 and J.-P. Thirion and A. Gourdon, "Computing the Differential Characteristics of Isointensity Surfaces," *Comput Vision Image Understand* 61, pp. 190–202, 1995.

Given a 3D data set in the form I(x, y, z), the following expressions represent separable filters that compute smoothed partial derivatives at the surface of a 3D structure by convolving the 3D filter with the discrete voxel data at vertex coordinates (x, y, z).

$I=(f_1(x)f_0(y)f_0(z))*I$,
$Ixx=(f_2(x)f_0(y)f_0(z))*I$.
$Ixy=(f_1(x)f_1(y)f_0(z))*I$,
$Ixyz=(f_1(x)f_1(y)f_1(z))*I$,
$Ixxz=(f_2(x)f_0(y)f_1(z))*I$,
$Ixxx=(f_3(x)f_0(y)f_0(z))*I$ As above, the subscript notation represents the partial derivative with respect to a spatial coordinate, e.g., x, y, and z. The asterisk "*" represents the convolution operator.

An implementation of the 3D filtering approach designed to detect lesions on the surface of an airway (e.g., bronchi or trachea) computes partial derivatives from the grey-scale voxel data at vertices of the airway surface. The segmentation method described above first computes the voxel data that forms the anatomical structure of interest. An isosurface representing the airway wall then acts as a guide to determine where to apply the 3D filter. In the implementation, the isosurface method detailed above computes the tessellated surface model, comprising a mesh of vertices. Note however that 3D filtering may also be used to compute the location of the surface in the segmented voxel data as well.

For selected points on the surface of the model (e.g., the vertices in the surface model), the 3D filtering method applies the 3D filters to compute the first and second order partial derivatives of the surface coordinates. The 3D filtering method begins by forming the filters to compute the partial derivatives according to the expressions listed above. The filters then sample voxels in a predetermined neighborhood around each vertex to compute the partial derivatives.

In the implementation used in our experiments, for example, the size of the 3D filters was set to approximately 5×5×5 mm$^3$ with an adjustment made for the anisotropy of the 3D dataset. For example, a kernel of size 11×11×11 voxels actually used an 11×11 voxel component in the plane of section (0.5 mm in-plane voxel size) but along the longitudinal direction (1 mm section thickness) the kernel was only 5 voxels thick. The normalization coefficients of these filters were computed using discrete sums performed over the size of the kernel. The implementation applied the separable filters to the image I(x, y, z) using convolutions to compute smoothed partial derivatives. These partial derivatives were used to compute the Gaussian (K), mean (H), and principal curvatures ($K_{MIN}$, $K_{MAX}$) at each vertex on the isosurface. The curvature values were used to colorize the surface based on various selection criteria (type of curvature, range of values, connectivity of neighboring vertices of like curvature classification).

In experiments comparing both the patch-fitting and 3D filtering methods, the filtering method was more computationally efficient. The type of curvature characteristic used to detect lesions was significant in this comparison. For example, using the mean curvature (H) with the 3D filtering method, there were two to three times as many lesion detections for a curvature threshold of −1 and −2 compared to processing which used the maximum curvature as the curvature characteristic to classify lesions. The 3D filtering method produced more visually appealing color-encoded surfaces because potential lesions were painted more homogenously.

In general, the 3D filtering method tends to have a more efficient implementation because it can combine isosurface generation, smoothing, and lesion detection in one step, whereas the patch fitting method involves a series of steps. The 3D filtering approach has other potential advantages in that it performs better for highly curved surfaces that are difficult to fit with a parametric patch. Since the 3D filtering method does not need a smoothing routine as a pre-processing step, it operates on a model that is closer to the actual data. Characteristics of both approaches are compared and contrasted in Table 4 below.

TABLE 4

| Parameter | Possible Choices | Parameters Used |
|---|---|---|
| Curvature Type | Gaussian (K), Mean (H), Principal ($K_{MIN}$, $K_{MAX}$) | K, $K_{MAX}$ |
| Secondary and Derived curvatures | metric determinant $\sqrt{g}$, quadratic variation Q, coordinate angle function, magnitude of principal curvature difference $\sqrt{H^2-K}$, HK− sign map | N/A |
| Filter settings for desirable curvature values | Arbitrary | Upper limit: 0, −1, or −2 cm$^{-1}$ Lower limit: −20 cm$^{-1}$ |
| Kernel size+ | Arbitrary | 7x7x9, 9x9x9, 11x11x11 voxels (~3, 4, 5 mm in each direction, respectively.) |
| Connected component size (minimum region size having homogeneous curvature classification) | Arbitrary | 30 vertices (~3 mm diameter) |
| Patch size* | Arbitrary | 5 mm |

(+applies to 3D filtering method only.
*applies to patch method only.)

Figure 8:
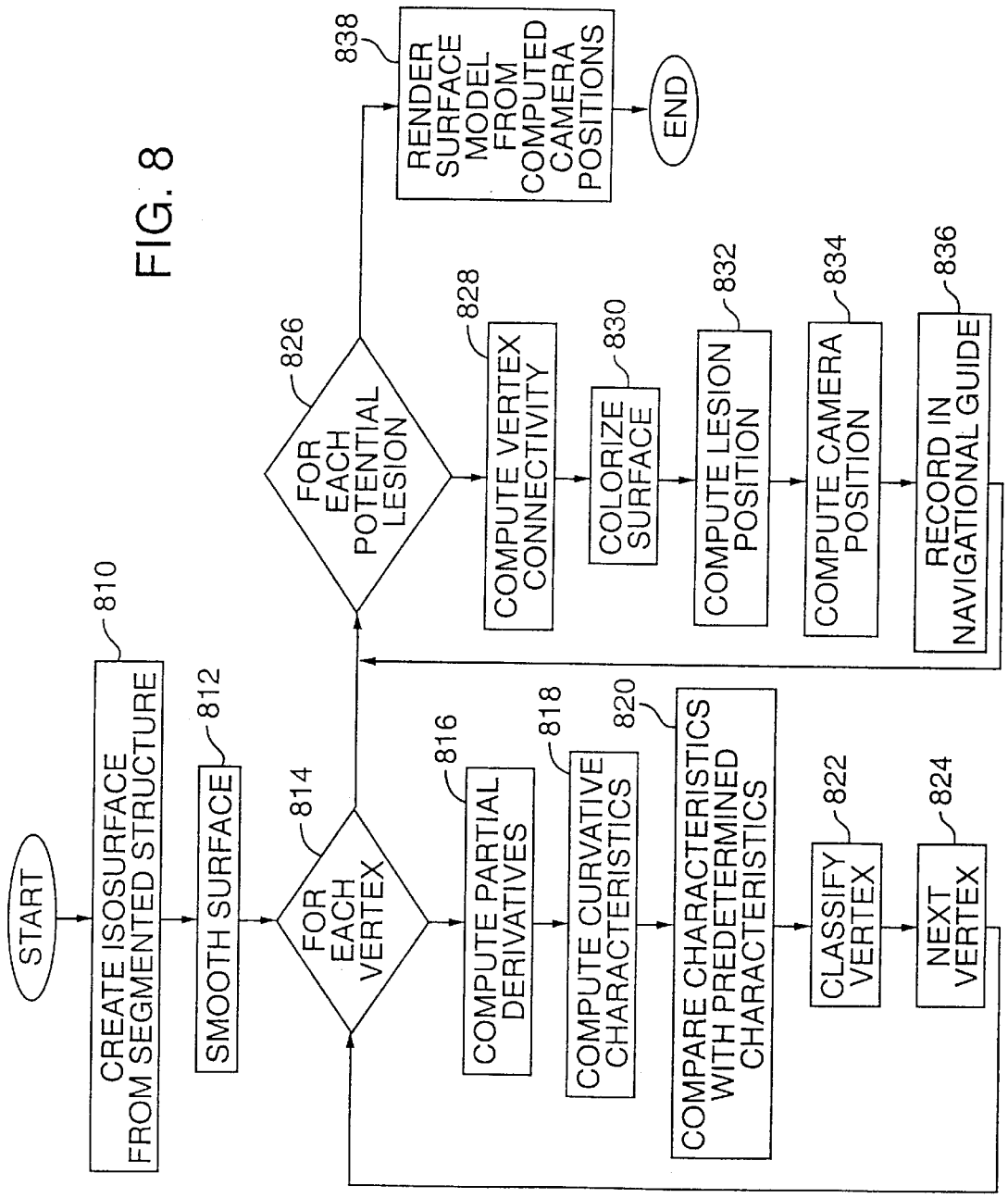
FIG. 8 is a flow diagram illustrating a process for detecting and viewing surface anomalies in a computer model of an anatomical structure.

FIG. 8 is a flow diagram illustrating an overview of the lesion detection processes described above. Starting with a set of voxels, the process computes an isosurface of the anatomical structure depicted in the voxel data as shown in step 810. The isosurface represents the surface of an anatomical structure where lesion detection is to take place. Optionally, the surface is smoothed as shown in step 812. As noted, the smoothing process is usually only needed for complex models where the patch-fitting method is used to compute partial derivatives of the surface. As noted, the isosurface generation and smoothing steps may be combined with the lesion detection process.

As shown in steps 814–824, the lesion detection process traverses the isosurface, visiting vertices and computing partial derivatives at these vertices (816). In the patch fitting approach, the partial derivatives are computed from the patch fitted to the surface located at the vertex. In the 3D filtering approach, the partial derivatives are computed by convolving the filter over the discrete voxel data at neighboring voxels.

As shown in step 818, the lesion detection process computes the curvature characteristics, such as the Gaussian, mean and minimum and maximum principal curvatures from the partial derivatives of the surface at the vertex. In step 820, the process compares these characteristics with predetermined characteristics associated with surface anomalies of interest, and classifies a vertex as to whether or not it is located on a lesion in step 822. The process iterates on vertices in the isosurface, and then, proceeds to a post-processing phase.

Post-processing functions optionally include refining lesion classification based on curvature characteristics, colorizing the surface of lesions, and computing camera positions as a navigational guide for rendering the surface into 2D images. As reflected in step 826, post processing is preferably targeted toward potential lesion sites on the surface.

To further refine lesion detection and reduce false positives, the post-processor filters the vertices to remove lesions below a predetermined size (e.g., having a number of vertices below a predetermined number). The vertex connectivity method of step 828 refers to the region growing process described above that segments neighborhoods of connected vertices sharing a predetermined curvature characteristic.

To visually flag an identified lesion, the process colorizes the vertices associated with an identified lesion. Note, this step may also be combined with the classification step 822 such that vertices are assigned color values when they have a predetermined curvature characteristic.

Steps 832–836 are additional steps used to assist viewing of the lesions in an interactive rendering process performed on the surface model. In step 832, the process computes a lesion position, for example, by computing the centroid of a cluster of vertices classified as a lesion. In step 834, the process computes a camera position and direction, for example, by averaging the surface normals of the vertices in the cluster and placing the camera at a selected distance from the lesion within the airway. Note that positioning the camera should take into account the surrounding surface structure to ensure that the lesion is not occluded by another structure in a later 2D image rendering. Each of the lesions are recorded in a navigational guide comprising a list of 3D scenes for rendering to 2D images. This list includes the camera position and direction, and possibly other scene parameters for each lesion such as the type of projection, the image resolution, etc. Finally, step 838 represents the graphics rendering process that creates two-dimensional image renderings of the surface model at the pre-computed camera positions.

Figure 9:
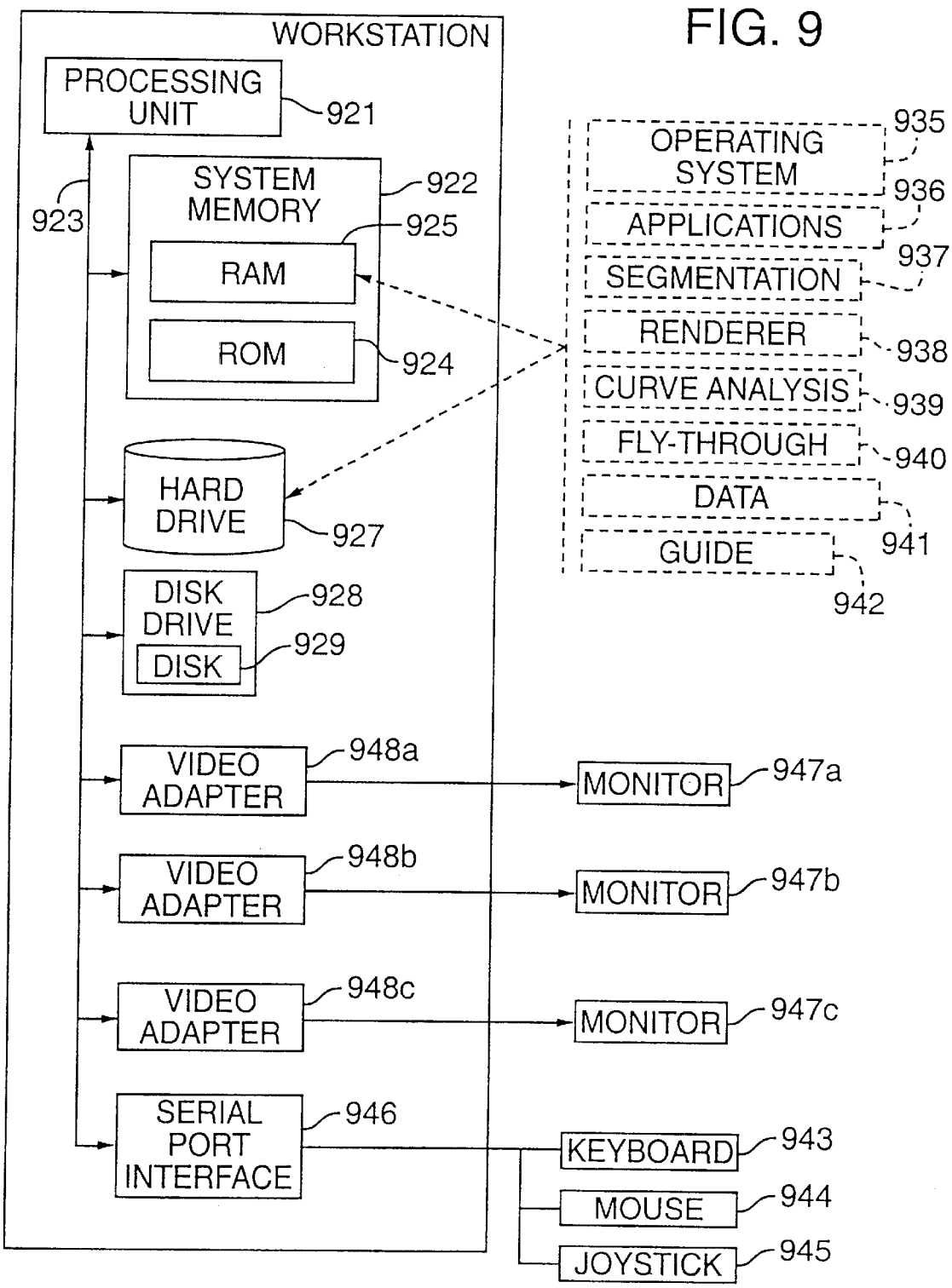
FIG. 9 is a block diagram of a computer system employed in one embodiment of the present invention.

VB surface renderings are generated using software rewritten in C++ using the OpenInventor 3-D modeling application programming interface (Silicon Graphics, Mountain View, Calif.). The surfaces are displayed and manipulated on a Silicon Graphics Indigo Maximum Impact workstation with 320 MB memory and 195 MHZ R 10000 CPU. A block diagram of a suitable computer system is shown in FIG. 9 (only illustrative ones of the applications programs are listed).

In implementations of both the patch fitting and 3D filtering methods, potential lesions are painted red to distinguish them from the background anatomy, which is colored a fleshy tone. The reviewing physician can then tour the 3D model by use of a joystick control in conjunction with fly-through software, identifying the potential lesion sites from their color and inspecting them as they are encountered.

As noted, this random virtual exploration of the anatomical structure can be informative, but may not make best use of the physician's time. Accordingly, in an alternative implementation, navigational software directs a guided tour of the structure, repositioning the viewpoint successively to each lesion listed in the guide. (The repositioning can be stepwise—one lesion to the next, or can proceed by a visualized fly-through to successive sites.)

In the implementation, the position of the visualization software viewpoint is aimed using a three step process. First, the centroid of the lesion is determined using the coordinates of each vertex that comprises the lesion. Second, the normal to the lesion is determined by averaging the normals of all the vertices which comprise the lesion. Third, the camera viewpoint is moved 1 cm away from the centroid along the averaged normal, and set to point toward the centroid. This procedure places the viewpoint inside the bronchial lumen pointing toward the lesion. Once the viewpoint has been so located, the physician can use the joystick to manipulate the viewpoint as desired, to view the site from different angles and distances. After the physician has taken whatever note of the lesion is merited, the software proceeds to display the next lesion listed in the guide.

By this viewpoint positioning procedure, apparent lesions at sites of segmentation leakage can often be identified and discarded since the resulting view is recognized as not being within a bronchial passage.

In an additional feature, segmentation leakage is identified by pattern recognition techniques, as reviewed in the Background discussion. As there noted, deletion of leakage in reliance on automatic techniques is disfavored in medicine due to the possible deletion of clinically significant features. But here, the leakage is not deleted. Rather, it is flagged to the reviewing physician. For example, lesions in areas of possible leakage can be falsely colored to provide a visual cue to the physician of the likely leakage context. Alternatively, a tabular listing of the detected lesions (e.g. a printout of the guide) can be marked to indicate those lesions that are found in areas of likely leakage.

Some physicians, of course, will prefer to manually identify areas of segmentation leakage by cross-referencing the lesion location to the orthogonal two-dimensional source images (axial, coronal and sagittal) and eliminate those that are not within a bronchus.

Both the curve fitting and 3D filtering methods were tested on elemental surfaces (sphere and torus), an airway phantom fitted with simulated lesions, cadaver lung specimens, and patient airway studies. The phantom, cadaver, and patient studies were each done at a number of different thresholds for mean curvatures ($\epsilon \geq 0$, $\epsilon \geq 1$, $\epsilon \geq 2$ cm$^{-1}$).

Tessellated surfaces representing a sphere and a torus were generated by taking isosurfaces of the corresponding implicit functions. The surface normals were set to point outward. A sphere has constant elliptical curvature, and its minimum and maximum principle curvatures are equal everywhere on its surface. A torus is a useful surface because it has curvature of all three types: elliptical curvature along its outer margin, hyperbolic curvature on the inside (the hole in the torus), and cylindrical curvature at the junction between the two.

A latex airway phantom was fitted with spherical simulated lesions consisting of plastic beads ranging in size from 3 to 10 mm. The phantom was scanned with a High-Speed Advantage helical CT scanner (General Electric Medical Systems, Milwaukee, Wis.) using 3 mm collimation, pitch 2, and section index 1 mm. A surface-rendered virtual bronchoscopy was produced from the CT images using the region-growing and threshold based segmentation method detailed earlier.

Intact human whole lung specimens were obtained from autopsies. Whole lung specimens included the central airways. Specimens were scanned helically on the CT scanner within 3 hours of autopsy using 3 mm collimation, pitch 1, and section index 1 or 1.5 mm.

Virtual bronchoscopy of patients was done using helical CT scans of the chest obtained with 3 mm collimation, pitch 2, and section index 1 mm. Eighteen studies from 16 patients were obtained. In one study, scanning began at the level of the mainstem carina. The patients were a mixture of those having known or suspected airway disease and those with lung cavities who were not suspected of having airway disease. Patients in the first category included four patients with Wegener's granulomatosis, and three with endobronchial masses due to neoplasm (lymphoma, melanoma) or infection (aspergilloma). One patient with Wegener's was scanned three times. Patients in the second category included nine with cavitary lung disease (five with Job's syndrome, one with Mycobacterium avium intracellulare infection, one with multiple drug resistant tuberculosis, one with chronic granulomatous disease, one with echinoccus). The mean patient age was 35±11 years (range: 14 to 59). There were 9 male and 7 female patients.

The gold standard for lesion detection for cadaver specimens was the histopathologic analysis. The gold standard for lesion detection for the VB studies was the two-dimensional source CT images. True lesion sites determined by analyzing the CT scans and lesion detections determined automatically by the software were recorded on an anatomical drawings of the airway for each specimen and patient study. True lesion size was measured from the CT images using calipers. Lesion sites and sizes on the CT scans were determined by a single radiologist experienced with chest CT and VB.

Sensitivity (from the true positives and false negatives) was computed both on the basis of lesions and bronchial segments. Specificity (from the true positives and false negatives) was computed both on the basis of lesions and bronchial segments. Specificity (from the true negatives and false positives) was computed on the basis of bronchial segments. The bronchial segment method was devised to determine specificity because if lesion sites were used there are a potential infinity of true negative lesion sites yielding a specificity of 1. Five bronchial segments were defined: the trachea, left and right mainstem bronchi, and left and right lobar/segmental bronchi. The data were further subdivided to analyze lesions <5 mm and those ≧5 mm. Sensitivity and specificity for this segment data as a function of lesion size and mean curvature threshold ($\epsilon$) were plotted as a receiver-operating characteristic (ROC) curve. The effect of changes in $\epsilon$ can be understood by reference to the spherical polyp analogy. For $\epsilon=0$, all lesions are detected. For greater $\epsilon$, progressively more highly curved (smaller) lesions are detected and more gently curved larger ones are excluded. In practice, more gently curved areas (small $\epsilon$) tend to represent minor undulations in the bronchial wall rather than true lesions.

Results

The curvature of the sphere and torus were correctly classified by both methods. The computer mean curvature for the sphere was 1.96±0.03 $cm^{-1}$ and for the outer edge of the torus was 0.10±0.01 $cm^{-1}$, which agree closely with the expected values (2.0 and 0.10 $cm^{-1}$, respectively). The junction between elliptical and cylindrical curvature on the torus was somewhat irregular. This was due to slight variations in the orientation and size of the biparametric spline patches and to a finite number of vertices in these areas of low curvature.

The airway phantom experiment, the curve fitting method correctly detected 10 of 10 lesions 5 mm in size or greater (sensitivity 100%). Of 5 lesions less than 5 mm, none were detected (sensitivity 0%).

In the five lung cadaver specimens having no endobroncial lesions, there were three false positive lesion sites, all in the same specimen. Six lesion sites in areas of segmentation leakage were easily discarded.

There were 31 known lesions on the VB patient studies. After discarding 40, 23, and 11 detections at sites of segmentation leakage, the curve-fitting method correctly detected 27, 26, and 19 of these lesions for $\epsilon$ of 0, 1, and 2 $cm^{-1}$, yielding sensitivities of 87, 84, and 61%, respectively. There were 76, 36, and 10 false positive lesions sites, respectively. On the basis of bronchial segments, specificity ranged from 63 to 89% and sensitivity from 56 to 94%. Sensitivity and specificity were greater for larger lesions as expected.

The most frequent causes of false positive detections were.a posterior indentation of the proximal trachea by the esophagus (8 of 89 segments) and an irregular bronchial wall (7 of 89 segments). Other less frequent causes were artifacts from breathing and beam hardening from vascular clips, vascular impressions, and bronchial webs (each<four segments).

Discussion

The sensitivity and specificity of the curve-fitting method are greater for lesions greater than 5 mm in size and are dependent on the choice of the threshold parameter $\epsilon$. There is a trade-off: a greater $\epsilon$ yields fewer false positives at the expense of some true positives, and vice versa. The sensitivity and specificity are quite high and it may be possible to improve them with further optimization.

False positive sites occur in regions of segmentation leakage. The above-described technique for constraining leakage reduces the number of such false positive sites, but some still persist.

The smallest lesions in the airway phantom were not detected, yet lesions of similar size in the patient studies were detected. The reason for this discrepancy is that high curvature regions were poorly fit by the spline algorithm. The small simulated lesions in the airway phantom had uniformly high curvature values (because they are spherical). True lesions are not spherical and their curvature spans a range of values which are more readily detected by our algorithm.

In the experiments, the curve-fitting method makes the assumption that pathologic structures have elliptical curvature of the peak type. It is of interest to speculate on whether this assumption is Generally valid. In order to do so, a geometrical anatomical ("geoanatomical") argument is made. The airways consist of branching tubular structures which in humans bifurcate at variable intervals. More proximal airways contain cartilage in their walls which ripple the wall like an accordion. More distal airways do not contain cartilage but are below the resolution of current CT scanners. Each generation of bronchi are progressively smaller in caliber, and individual bronchi tend to taper. Based on these characteristics, normal bronchi consist of surfaces of cylindrical curvature, and the crotch at bifurcations are saddle points of hyperbolic curvature since they are junctions of two intersection tubular bronchi. Therefore, elliptical surfaces of peak type are uncharacteristic of normal airway.

A geometric taxonomy of other tubular hollow anatomic structures yields similar generalizations and indicates that the same method may be generally applicable. For example, blood vessels are also tubular branching structures but without rippling striations. Atherosclerotic plaque may modify curvature in this situation. A distended colon is a series of concave-walled chambers of elliptical curvature of the pit type (as seen from the lumen) interspersed with haustral folds which are saddle points of hyperbolic curvature. Colonic polyp, precursor malignant lesions, may be plaque-like or may extend into the lumen, in which case their abnormal curvature may be detected. Thus, the curvature analysis methods described above can be used in a variety of applications to identify anomalies. These methods are not limited to anatomical structures, but instead, also apply to detecting surface anomalies on mechanical structures such as pipes and biological structures such as plants.

Another method of lesion detection from virtual endoscopy has been proposed by Vining et al. in an abstract ("Technical Improvements in Virtual Colonoscopy," Radiology 201(P) 424–25 (1996)). In this method, abnormal thickness of the bronchial or colonic wall is used to detect malignancy. As in the foregoing method, Vining's method is prone to a high rate of false positive lesion sites because the outer wall of the tubular structure needs to be detected but is easily misidentified. Detection of the outer edge of the wall is routinely difficult because juxtaposed structures of similar CT attenuation are common in the mediastinum and abdomen and promote overestimation of wall thickness. In addition, colonic wall thickness varies with degree of distention.

As noted, there is a relatively high rate of false positive lesion detections using the above-described techniques. Unfortunately, a high rate of false positives may be intrinsic to any scheme of automatic detection. Computer-assisted diagnosis is an inherently difficult problem due to the heterogeneity of possible pathology affecting various organs and the variable appearance of normal anatomy. With this in mind, the foregoing method does well with a manageable number of false positive lesion sites per patient and a high sensitivity.

Additional information on the foregoing techniques can be found in Summers et al, "Virtual Bronchoscopy of Endobronchial Lesions: Computer-Assisted Detection of Polypoid Lesions Using Surface Curvature," Proc. Int'l Conf on Mathematical Models and Methods in the Health Sciences, May, 1997.

Additional information relating to the subject matter of this invention, and different contexts in which the improvements discussed above can be employed, can be found in U.S. Pat. Nos. 559,847, 5,345,490, 5,291,402, 5,187,658, 5,166,876, 5,113,357, 4,989,142, 4,985,834, 4,984,157, 4,953,087, 4,914,589, 4,905,1484,903,202, 4,879,668, 4,868,748, 4,831,528, 4,821,213, 4,821,210, 4,791,567, 4,751,643, 4,729,098, 4,719,585, 4,710,876, to General Electric, the disclosures of which are incorporated by reference herein.

Operating Environment

FIG. 9 illustrates an example of a computer workstation that serves as an operating environment for the invention. The computer system includes a workstation 920, including a processing unit 921, a system memory 922, and a system bus 923 that interconnects various system components including the system memory to the processing unit 921.

The system bus may comprise any of several types of bus structures including a memory bus or memory controller, a peripheral bus, and a local bus using a bus architecture such as PCI, VESA, Microchannel (MCA), ISA and EISA, to name a few.

The system memory includes read only memory (ROM) 924 and random access memory (RAM) 925. A basic input/output system 926 (BIOS), containing the basic routines that help to transfer information between elements within the personal computer 920, such as during start-up, is stored in ROM 924.

The workstation 920 further includes a hard disk drive 927, and another disk drive such as a magnetic disk drive 928, e.g., to read from or write to a removable disk 929, or an optical disk drive, e.g., for reading a CD-ROM disk or to read from or write to other optical media. The hard disk drive 927, and additional disk drive 928 are connected to the system bus 923 by a drive interface. The drives and their associated computer-readable media provide nonvolatile storage of data, data structures, computer-executable instructions (program code such as dynamic link libraries, and executable files), etc. for the workstation 920.

Although the description of computer-readable media above refers to a hard disk, a removable magnetic disk and a CD, it can also include other types of media that are readable by a computer, such as magnetic cassettes, flash memory cards, digital video disks, Bernoulli cartridges, and the like.

A number of program modules may be stored in the drives and RAM 925, including an operating system 935, one or more application programs 936, other program modules 937–940, and program data 938. For example, the program modules may include a segmentation program 937, a 3D graphics rendering program 938, a curve analysis program 939, and a navigational fly-through program 940 that operates in conjunction with the renderer 938 to position the camera interactively using the pre-computed camera positions for lesions in the navigational guide 942.

A user may enter commands and information into the workstation 920 through a keyboard 943 and pointing device, such as a mouse 944 and joystick 945. These and other input devices are often connected to the processing unit 921 through a serial port interface 946 that is coupled to the system bus, but may be connected by other interfaces, such as a parallel port, game port or a universal serial bus (USB).

One or more monitors 947a–c or other types of display devices are also connected to the system bus 923 via an interface, such as a video adapter 948a–c. Graphics workstations typically include graphics acceleration hardware to off-load graphics rendering tasks from the processing unit 921. Such hardware is typically implemented in a video adapter or in a separate peripheral connected to the bus 923.

Conclusion

Having described and illustrated the features of our invention, it will be apparent that the embodiments shown can be modified in arrangement and detail without departing from the principles of the invention.

The variant features described above and in the cited patents can each be combined with each other in numerous ways, depending on the application to be served. For brevity's sake, however, such permutations and combinations are not each individually detailed herein. We claim all that falls within the spirit and scope of the following claims:

We claim:

1. A computer-assisted method for detecting anomalies in a model representing a three-dimensional anatomical structure, the method comprising:

computing a curvature characteristic in a local neighborhood around a vertex in the model;

classifying curvature of a cluster of connected vertices by comparing the computed curvature characteristic to a predetermined curvature classification; and defining an anomaly as a cluster of connected vertices having a predetermined curvature classification.

2. The method of claim 1 further comprising:
computing partial derivatives during traversal of the model representing the three-dimensional anatomical structure;
wherein the curvature characteristic is computed from the partial derivatives.

3. The method of claim 2, wherein
the model representing the anatomical structure comprises a plurality of vertices; and
computing partial derivatives comprises computing partial derivatives at the vertices.

4. The method of claim 2 wherein computing partial derivatives comprises convolving a filter over discrete voxel data at neighboring voxels.

5. The method of claim 2 wherein the curvature characteristics comprise Gaussian curvatures computed from the partial derivatives.

6. The method of claim 2 wherein the curvature characteristics comprise curvatures chosen from one or more of the following and computed from the partial derivatives:
Gaussian curvatures;
mean curvatures; and
principal curvatures.

7. The method of claim 2 wherein computing partial derivatives comprises employing a 3D filtering technique.

8. The method of claim 7 wherein computing partial derivatives comprises employing a kernel in the 3D filtering technique.

9. The method of claim 1 further comprising:
before computing the curvature characteristic around the vertex in the model, fitting a parametric patch to the local neighborhood around the vertex in the model.

10. The method of claim 9 wherein the parametric patch comprises a b-spline patch.

11. The method of claim 1 wherein the local neighborhood comprises one or more isosurfaces.

12. The method of claim 1 wherein the local neighborhood comprises a wall of the anatomical structure.

13. The method of claim 1 wherein
the model comprises a three-dimensional surface model.

14. The method of claim 1 wherein
the three-dimensional anatomical structure comprises a colon; and
the anomaly comprises a polyp.

15. A computer-readable medium comprising computer-executable instructions for performing the following to detect anomalies in a model representing a three-dimensional anatomical structure:
computing a curvature characteristic in a local neighborhood around a vertex in the model;
classifying curvature of a cluster of connected vertices by comparing the computed curvature characteristic to a predetermined curvature classification; and
defining an anomaly as a cluster of connected vertices having a predetermined curvature classification.

16. An apparatus operable to detect anomalies in a model representing a three-dimensional anatomical structure, the apparatus comprising:
means for computing a curvature characteristic in a local neighborhood around a vertex in the model;
means for classifying curvature of a cluster of connected vertices by comparing the computed curvature characteristic to a predetermined curvature classification; and
means for defining an anomaly as a cluster of connected vertices having a predetermined curvature classification.

17. A method of detecting anomalies in an anatomical structure, the method comprising:
computing a representation of the anatomical structure;
computing curvature characteristics for the representation of the anatomical structure;
comparing the curvature characteristics with predetermined characteristics associated with anomalies; and
identifying an anomaly in the representation of the anatomical structure based at least on the comparing.

18. The method of claim 17 further comprising:
computing partial derivatives during traversal of the representation of the anatomical structure;
wherein the curvature characteristics are computed from the partial derivatives.

19. The method of claim 18 wherein computing partial derivatives comprises employing a 3D filtering technique.

20. The method of claim 19 wherein computing partial derivatives comprises employing a kernel in the 3D filtering technique.

21. The method of claim 18 wherein
the representation of the anatomical structure comprises a plurality of vertices; and
traversal of the representation of the anatomical structure comprises visiting the vertices.

22. The method of claim 18 wherein
the representation of the anatomical structure comprises a plurality of vertices; and
computing partial derivatives comprises computing partial derivatives at the vertices.

23. The method of claim 18 wherein computing partial derivatives comprises convolving a filter over discrete voxel data at neighboring voxels.

24. The method of claim 18 wherein the curvature characteristics comprise Gaussian curvatures computed from the partial derivatives.

25. The method of claim 18 wherein the curvature characteristics comprise curvatures chosen from one or more of the following and computed from the partial derivatives:
Gaussian curvatures;
mean curvatures; and
principal curvatures.

26. The method of claim 17 wherein computing curvature characteristics comprises computing a curvature characteristic in a local neighborhood around a vertex in the representation.

27. The method of claim 26 further comprising:
before computing the curvature characteristic around the vertex, fitting a parametric patch to the local neighborhood around the vertex in the model.

28. The method of claim 17 wherein the representation of the anatomical structure comprises a plurality of vertices, the method further comprising:
classifying a cluster of vertices in the representation of the anatomical structure as an anomaly.

29. The method of claim 17 wherein the anomaly comprises a lesion.

30. The method of claim 17 wherein the anomaly comprises a polypoid lesion.

31. The method of claim 17 wherein curvature characteristics are computed from a representation of a surface of the anatomical structure.

32. The method of claim 17 wherein computing a representation of the anatomical structure comprises computing an isosurface of the anatomical structure.

33. The method of claim 17 wherein
the representation of the anatomical structure represents a wall of a bronchus captured from a scan of a human patient; and
the anomaly represents a lesion detected on the wall.

34. The method of claim 17 wherein
the anatomical structure comprises a colon; and
the anomaly represents a polyp detected in the colon.

35. The method of claim 17 further comprising:
displaying a depiction of the representation of the anatomical structure;
wherein identified anomalies are colored to distinguish from background anatomy.

36. The method of claim 17 further comprising:
presenting a guided virtual tour of the anatomical structure, repositioning a viewpoint to a plurality of identified anomalies.

37. The method of claim 17, wherein predetermined characteristics indicating elliptical curvature of peak subtype are associated with surface anomalies.

38. A computer-readable medium comprising computer-readable instructions for performing the following to detect anomalies in an anatomical structure:
computing a representation of the anatomical structure;
computing curvature characteristics for the representation of the anatomical structure;
comparing the curvature characteristics with predetermined characteristics associated with anomalies; and
identifying an anomaly in the representation of the anatomical structure based at least on the comparing.

39. A computer-implemented method comprising:
computing a representation of a bronchus comprising a plurality of vertices;
computing partial derivatives during traversal of the vertices of the representation of the bronchus via a 3D filter;
computing curvature characteristics from the partial derivatives;
based on the curvature characteristics, classifying a shape; and
identifying a polypoid lesion in the representation of the bronchus based on having classified the shape as elliptical with a peak subtype.

40. An apparatus operable to detect anomalies in an anatomical structure, the apparatus comprising:
means for computing a representation of the anatomical structure;
means for computing curvature characteristics for the representation of the anatomical structure;
means for comparing the curvature characteristics with predetermined characteristics associated with anomalies; and
means for identifying an anomaly in the representation of the anatomical structure based at least on the comparing.

* * * * *

UNITED STATES PATENT AND TRADEMARK OFFICE
CERTIFICATE OF CORRECTION

PATENT NO. : 6,556,696 B1
DATED : April 29, 2003
INVENTOR(S) : Summers et al.

It is certified that error appears in the above-identified patent and that said Letters Patent is hereby corrected as shown below:

<u>Title page,</u>
Item [56], References Cited, OTHER PUBLICATIONS, "Summers et al." reference, "Polypoid Lesions of Airways: Early Exposure with Computer-assisted Detection by Using Virtual Bronchoscopy and Surface Curvature," should read -- Polypoid Lesions of Airways: Early Experience with Computer-assisted Detection by Using Virtual Bronchoscopy and Surface Curvature, --.

<u>Column 2,</u>
Line 39, "With" should read -- with --.

<u>Column 3,</u>
Lines 59-60, "(e.g. several approaches generally suitable," should read -- (e.g. several overlapping voxels) before extending region growth to a voxel. Finding none of these approaches generally suitable, --.

<u>Column 6,</u>
Line 27, "Wake" should read -- make --.

<u>Column 11,</u>
Line 40, "nab," should read -- $\pi$ab --.

<u>Column 12,</u>
Line 51, "Bronchal" should read -- Bronchial --.

<u>Column 13,</u>
Lines 33-39, delete repetitive language "(CGD = chronic granulomatous disease, JS = Job syndrome, LG = lymphomatoid granulomatosis, MAI = *Mycobacterium avium-instracellulare*, MDRTB = multiple drug-resistant tuberculosis, RP = relapsing polychondritis, WG = Wegener granulomatosis. *Worst-case frame rate. The frame rate increases dramatically in the smaller airways. †Includes one or more cavities)"
Line 59, "granulomnatous" should read --granulomatous--.

<u>Column 14,</u>
Line 50, "dat" should read -- data --.

<u>Column 16,</u>
Line 19, "produces" should read -- produced --.

<u>Column 19,</u>
Line 1, "J.-P." should read -- J.P. --.

UNITED STATES PATENT AND TRADEMARK OFFICE
CERTIFICATE OF CORRECTION

PATENT NO.  : 6,556,696 B1
DATED       : April 29, 2003
INVENTOR(S) : Summers et al.

It is certified that error appears in the above-identified patent and that said Letters Patent is hereby corrected as shown below:

Column 21,
Line 44, "rewritten" should read -- written --.

Column 23,
Line 24, "an anatomical drawings" should read -- anatomical drawings --.

Column 24,
Lines 1-2, "endobroncial" should read -- endobronchial --.
Line 48, "Generally" should read -- generally --.

Column 25,
Line 46, "559,847" should read -- 5,559,847 --.
Line 48, "4,905,1484,903,202" should read -- 4,905,148, 4,903,202 --.

Signed and Sealed this

Twelfth Day of April, 2005

JON W. DUDAS
*Director of the United States Patent and Trademark Office*